US008635749B2

(12) United States Patent
Mayers et al.

(10) Patent No.: US 8,635,749 B2
(45) Date of Patent: *Jan. 28, 2014

(54) MICROADHESIVE SYSTEMS AND METHODS OF MAKING AND USING THE SAME

(75) Inventors: Brian Mayers, Arlington, MA (US); Sandip Agarwal, Somerville, MA (US); Jeffrey Carbeck, Belmont, MA (US); David Ledoux, Boston, MA (US); Kevin Randall Stewart, Niskayuna, MA (US); George M. Whitesides, Newton, MA (US); Adam Winkleman, Brookline, MA (US)

(73) Assignee: Nano Terra Inc., Brighton, MA (US)

( * ) Notice: Subject to any disclaimer, the term of this patent is extended or adjusted under 35 U.S.C. 154(b) by 47 days.

This patent is subject to a terminal disclaimer.

(21) Appl. No.: 12/844,314

(22) Filed: Jul. 27, 2010

(65) Prior Publication Data
US 2011/0016675 A1 Jan. 27, 2011

Related U.S. Application Data

(60) Provisional application No. 61/228,851, filed on Jul. 27, 2009.

(51) Int. Cl.
*A44B 18/00* (2006.01)
(52) U.S. Cl.
USPC .................. 24/450; 24/304; 24/451; 428/100
(58) Field of Classification Search
USPC ............ 24/304, 306, 442–452; 428/100, 156
See application file for complete search history.

(56) References Cited

U.S. PATENT DOCUMENTS

| | | | | | |
|---|---|---|---|---|---|
| 3,192,589 | A | * | 7/1965 | Pearson | 24/452 |
| 3,266,113 | A | * | 8/1966 | Flanagan, Jr. | 24/452 |
| 3,312,583 | A | * | 4/1967 | Rochlis | 428/88 |
| 3,408,705 | A | * | 11/1968 | Kayser et al. | 24/452 |
| 4,748,063 | A | * | 5/1988 | Reuben | 428/78 |
| 4,875,259 | A | * | 10/1989 | Appeldorn | 24/584.1 |
| 4,946,527 | A | * | 8/1990 | Battrell | 156/60 |
| 5,071,363 | A | | 12/1991 | Reylek et al. | |
| 5,088,164 | A | * | 2/1992 | Wilson et al. | 24/584.1 |
| 5,201,101 | A | * | 4/1993 | Rouser et al. | 24/586.11 |
| 5,212,853 | A | * | 5/1993 | Kaneko | 24/452 |
| 5,221,276 | A | * | 6/1993 | Battrell | 604/389 |
| 5,634,245 | A | * | 6/1997 | Rouser et al. | 24/452 |
| 5,657,516 | A | * | 8/1997 | Berg et al. | 24/452 |
| 6,159,596 | A | | 12/2000 | Calhoun et al. | |
| 6,276,032 | B1 | * | 8/2001 | Nortman et al. | 24/572.1 |
| 6,303,062 | B1 | * | 10/2001 | Aamodt et al. | 264/167 |
| 2003/0156992 | A1 | | 8/2003 | Anderson et al. | |
| 2005/0227508 | A1 | | 10/2005 | Syms | |
| 2009/0100651 | A1 | * | 4/2009 | Naftalin et al. | 24/452 |

OTHER PUBLICATIONS

International Search Report for International Patent Application No. PCT/US2011/022527, filed Jan. 26, 2011, U.S. Patent and Trademark Office, Alexandria, VA, mailed Mar. 18, 2011.
Written Opinion for Internationl Patent Application No. PCT/US2011/022527, filed Jan. 26, 2011, U.S. Patent and Trademark Office, Alexandria, VA, mailed Mar. 18, 2011.
Office Action for co-pending U.S. Appl. No. 13/014,182, filed Jan. 26, 2011, inventors: Mayers, B. et al., U.S. Patent and Trademark Office, Alexandria, VA, mailed Sep. 6, 2013.

\* cited by examiner

*Primary Examiner* — Robert J Sandy
*Assistant Examiner* — Louis Mercado
(74) *Attorney, Agent, or Firm* — Sterne, Kessler, Goldstein & Fox P.L.L.C.

(57) ABSTRACT

Disclosed are adhesive systems and methods of making and using such systems. Exemplary adhesive systems include protrusions and/or grooves that can interleave to form a reversible adhesive interaction.

30 Claims, 20 Drawing Sheets

FIG 2H
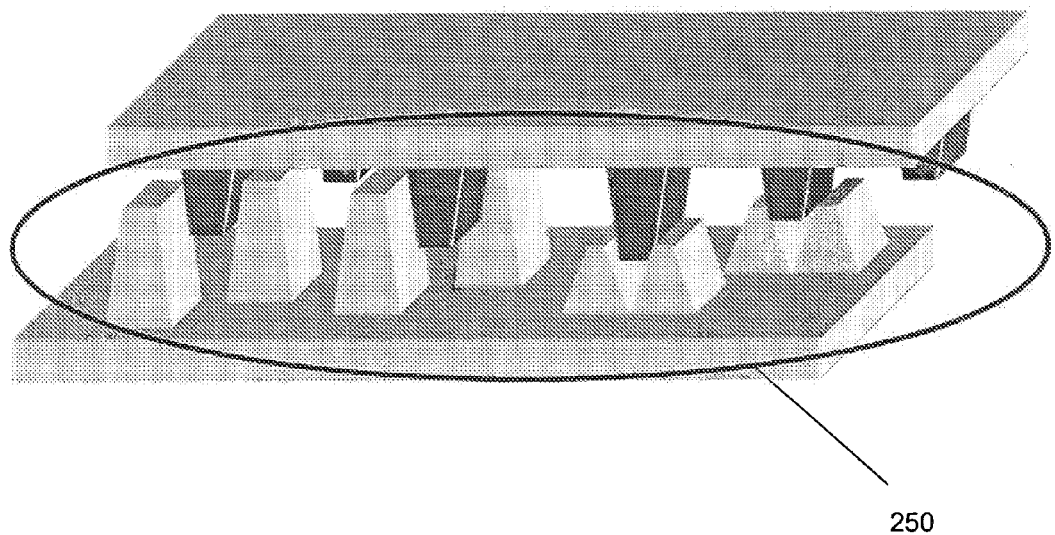
250
FIG 2I
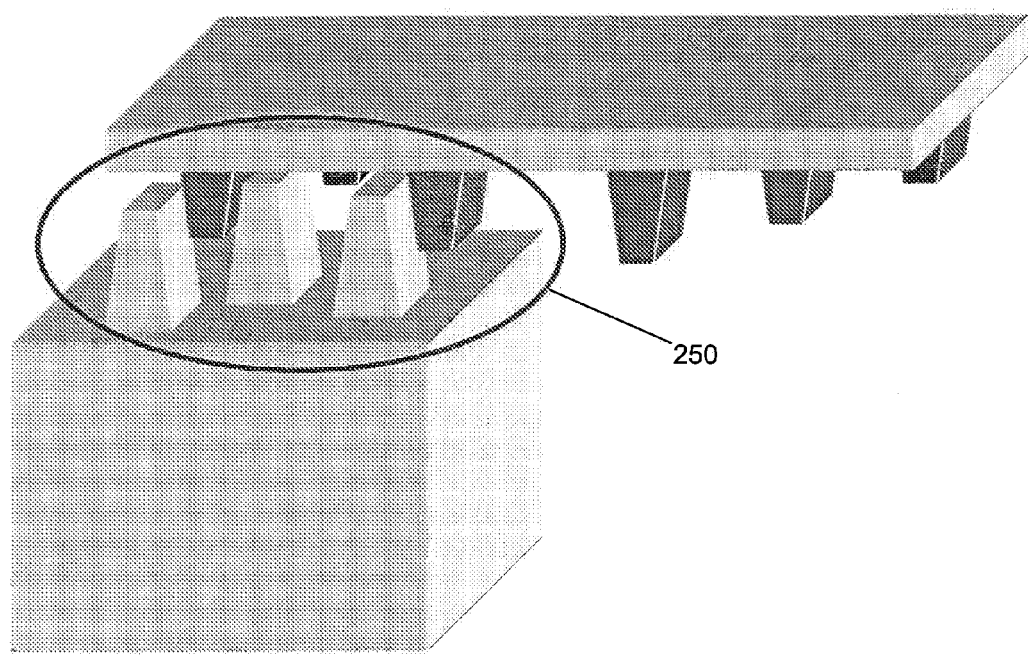
250
FIG 2H-2I

FIG 3A
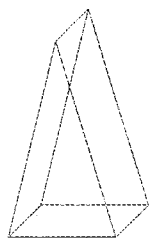
FIG 3B
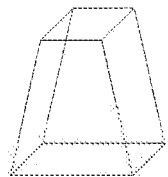
FIG 3C
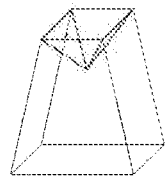
FIG 3D
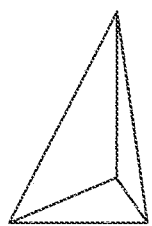
FIG 3E
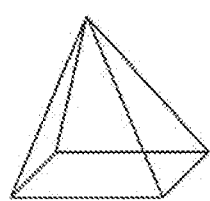
FIG 3F
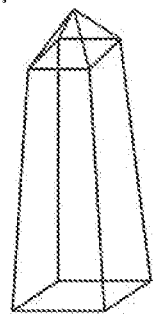
FIG 3G
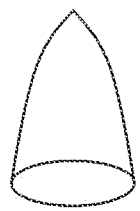
FIG 3H
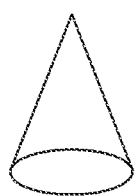
FIG 3I
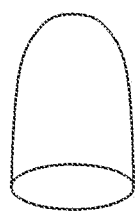
FIG 3A-3I

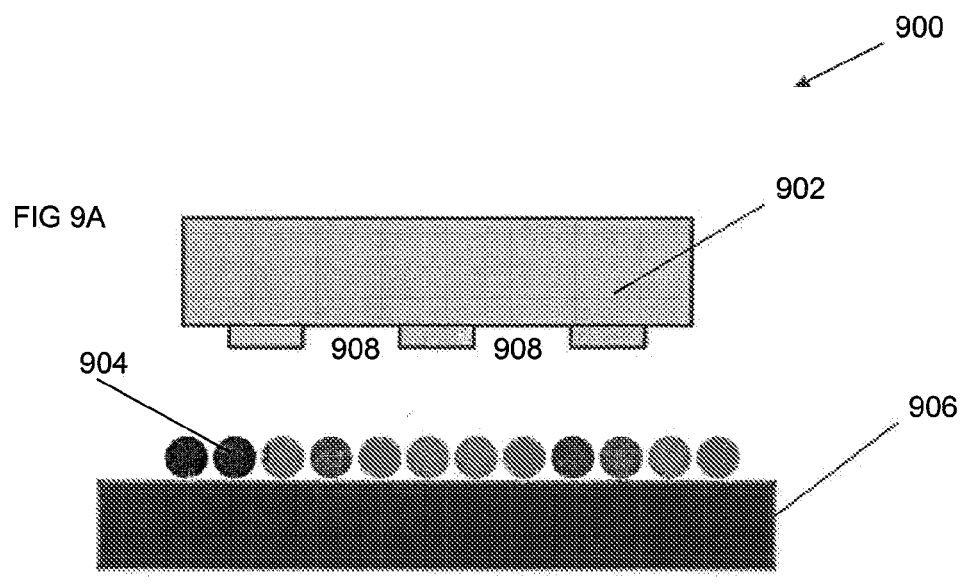
FIG 9A
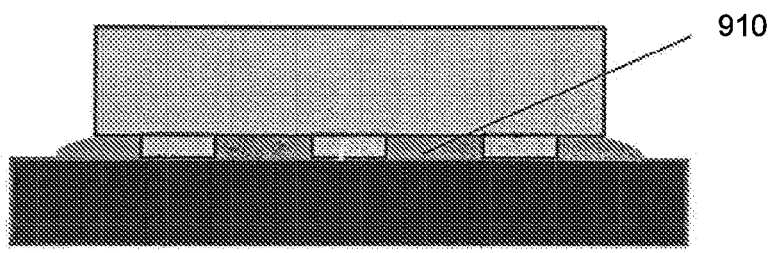
ΔT and Pressure
FIG 9B
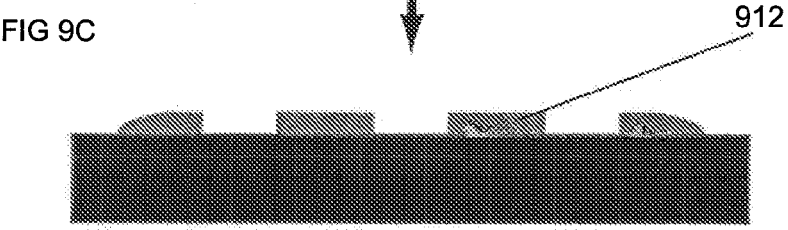
FIG 9C
FIG. 9A-9C FIG 10A
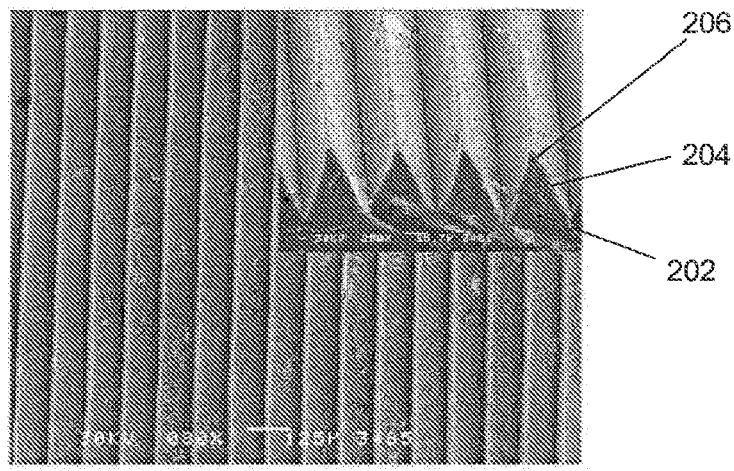
FIG 10B
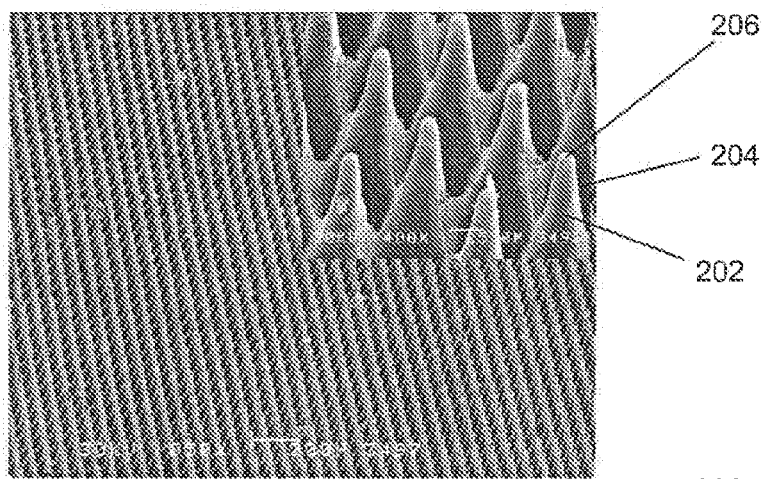
FIG 10C
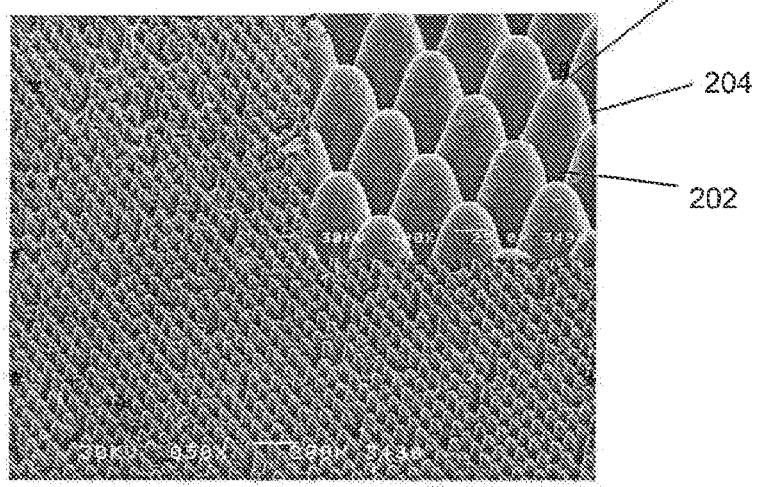
FIG. 10A-10C FIG 11A
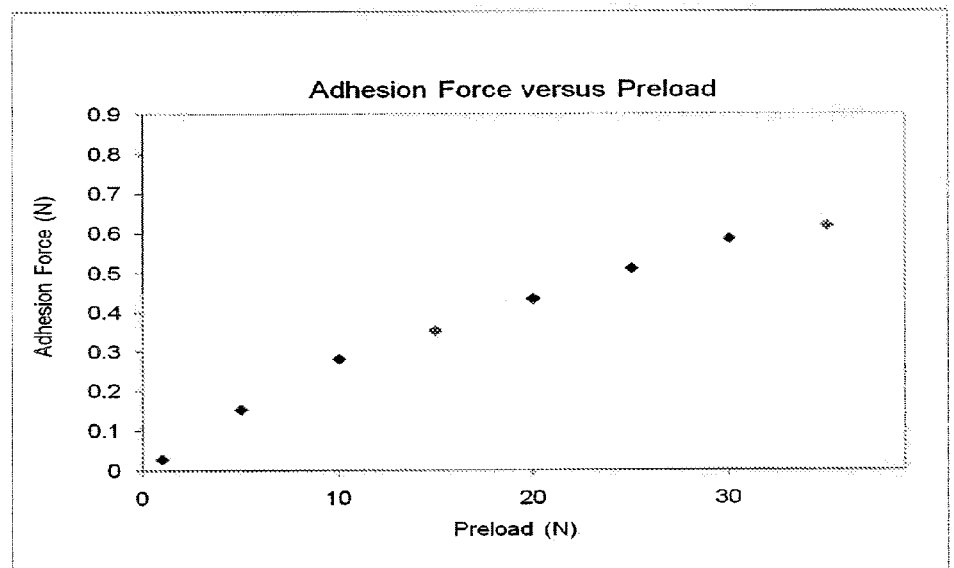
FIG 11B
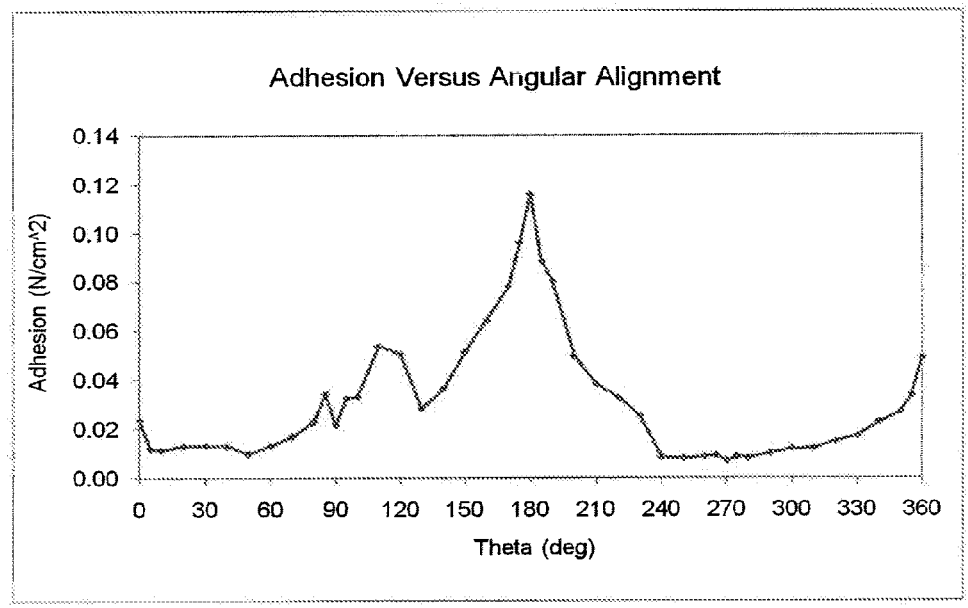
FIG. 11A-11B

MICROADHESIVE SYSTEMS AND METHODS OF MAKING AND USING THE SAME

CROSS-REFERENCE TO RELATED APPLICATIONS

This application claims the benefit of the filing date of U.S. Provisional Appl. No. 61/228,851, filed Jul. 27, 2009, which is incorporated herein by reference in its entirety.

BACKGROUND OF THE INVENTION

1. Field of the Invention

The present invention is directed to adhesive systems and methods of making and using such systems.

2. Background

Adhesives for bonding various structures to each other are used in nearly every industry. Typical adhesives rely on a material transition, for example a polymer changing from a liquid to a solid, such as epoxy. Such adhesives interpenetrate the two surfaces being bound to form a permanent or single use bond. Pressure sensitive adhesives (PSA) represent another common bonding material. PSAs (e.g., foam and rubber tapes), rely on a bond formed by van der Waals forces between two surfaces. By deforming one or more of the surfaces to increase the area of contact, the amount of adhesion is thereby increased.

Another class of adhesives is "dry adhesives," or materials that do not rely on a material transition or bond. Examples of dry adhesives include gecko feet and VELCRO®. While dry adhesives typically exhibit a lower adhesion strength than PSA or liquid adhesives, they offer a reusable, contaminant resistant, and/or selective adhesive system. However, typical dry adhesives are limited to certain applications and environments, due to their compositions and adhesion mechanisms.

What is needed is a dry adhesive system that can be utilized in more diverse environments and in a variety of applications. The present invention fulfills these needs.

BRIEF SUMMARY OF THE INVENTION

In one embodiment, the present invention provides adhesive systems. Exemplary adhesive systems comprise a first adhesive element comprising a flexible material. The adhesive element has a surface including an array of tapered protrusions thereon. The adhesive systems comprise a second adhesive element having a surface including an array of tapered protrusions or tapered grooves thereon. In suitable embodiments, the arrays of tapered protrusions or tapered grooves of the first and second adhesive elements have a periodicity that is substantially complementary. Thus, contacting the first adhesive element with the second adhesive element results in a substantial interleaving of the tapered protrusions of the first array with the tapered protrusions or tapered grooves of the second array. This interleaving provides a reversible adhesive interaction having a force per unit area of about 1 Newton/cm$^2$ (N/cm$^2$) to about 100 N/cm$^2$ between the first and second adhesive elements. However, if either of the first or second adhesive elements is contacted with an inert surface, an adhesive interaction having a force per unit area that is less than 50% of the adhesive interaction with a substantially complementary adhesive element, results. Suitably the adhesive interaction between the first and second adhesive elements is reversible. In other embodiments, the interaction between the first and second adhesive elements is irreversible.

In embodiments, the tapered protrusions of the first adhesive element and the tapered protrusions or tapered grooves of the second adhesive element are substantially free from barbs, hooks, spirals, loops, seta, spatulae, suction cups, or any other external structural elements. Suitably, contacting the first and second adhesive elements results in contact of greater than 30% of the total surface area that is desired to be contacted between the first array and the second array. In further embodiments, the adhesive systems comprise one or more liquids (e.g., water, lubricants, fouling agents, blood, surfactants, etc., and mixtures thereof) present between the first and second arrays. Suitably, the adhered system is substantially impermeable to liquid.

The protrusions or grooves suitably have a base portion attached to the surface, a tip portion free from the surface, and a tapered body portion connecting the tip or groove portion with the base portion.

In exemplary embodiments, the protrusions or grooves of the first and second adhesive elements have a vertical dimension of about 1 μm to about 500 μm, and the base portions have a lateral dimension of about 1 μm to about 100 μm. Suitably, the tapered body portions of the first and second adhesive elements have a tapered sidewall with an average angle of taper of about 5° to about 50°. The tip portions suitably have a maximum lateral dimension at the point where the tip portion meets the tapered body portion. Suitably the tip portions have a lateral dimension of about 50 nm to about 50 μm. In embodiments, the lateral dimensions of the tip portions and base portions of the protrusions or grooves have a dimensional ratio of about 1:2 to about 1:2,000.

In exemplary embodiments, at least one of the first and second adhesive elements comprises a flexible material. In exemplary embodiments, the flexible materials comprise elastomeric materials, such as polymers, including but are not limited to, a poly(dialkylsiloxane), a poly(silsesquioxane), a polyisoprene, a polybutadiene, a poly(acrylamide), a poly (alkylstyrene), polychloroprene, an acryloxy elastomer, a copolymer thereof, and combinations thereof. Suitably, at least one of the protrusions of the first and second adhesive elements has a Young's modulus of about 1 MPa to about 10 GPa. Suitably, the protrusions or grooves of the first and second adhesive elements are not bent upon themselves. In embodiments, the first and second adhesive elements are electrostatically complementary or magnetically complementary.

In additional embodiments, the first adhesive element is affixed to a first area of a first substrate and the second adhesive element is affixed to a second area of a second substrate. Suitably, the first and second adhesive elements are positioned such that the protrusions or grooves of the first adhesive element substantially interleave with the protrusions or grooves of the second adhesive element to provide a reversible adhesive interaction between the first and second substrates. Suitable substrates include, but are not limited to, a glass, a plastic, a metal, a paperboard, a fiber, a crystal, a mineral, a biological bone, a synthetic bone, a biological tissue, a synthetic tissue, composites thereof, and combinations thereof. Suitably, the first and second areas are on the same substrate, though in other embodiments, the first and second areas are on different substrates.

In embodiments, the first adhesive element comprises an adhesive layer attached to a second surface of the first adhesive element. The second adhesive element can comprise an adhesive layer attached to a second surface of the second adhesive element. The adhesive layers are suitable for attaching the first and second adhesive elements to a substrate. Suitably, the adhesive layer on the first and second adhesive elements is a wet adhesive layer, a pressure sensitive adhesive layer, a dry adhesive layer, or a combination thereof. A peelable protective layer covering the adhesive layers can also be utilized.

In exemplary embodiments, the base, tapered body, and tip portions of neighboring protrusions or grooves within the array of the first adhesive element do not contact one other. Suitably, the base, tapered body, and tip portions of neighboring protrusions or grooves within the array of the second adhesive element also do not contact one other. In embodiments, at least the tapered body portions of the first and second adhesive elements have a surface roughness of about one order of magnitude or less than the lateral dimensions of the first and second adhesive elements.

In further embodiments, the tapered body portion of the first adhesive element includes a first functional group and the tapered body portion of the second adhesive element includes a second functional group. Suitably, the first and second functional groups are capable of interacting with one another via an interaction selected from the group consisting of a non-covalent interaction, a covalent bonding interaction, and combinations thereof. Suitably, the tip portions of the protrusions or grooves include a liquidphobic functional group.

The present invention also provides methods of adhering a first area of a first substrate to a second area of a second substrate. Suitably, the methods comprise providing a first area of a first substrate comprising a first adhesive element including an array of protrusions or grooves having a base portion attached to the first area, a tip portion and a tapered body portion connecting the tip and base portions. A second area of a second substrate comprising a second adhesive element including an array of protrusions or grooves having a base portion attached to the first area, a tip portion and a tapered body portion connecting the tip and base portions, is also provided. Suitably, the protrusions or grooves have a vertical dimension of about 1 μm to about 500 μm, and the base portions of the protrusions or grooves have a lateral dimension of about 1 μm to about 100 μm. Protrusions or grooves of the first and second adhesive elements are substantially free from barbs, hooks, spirals, loops, seta, spatulae, suction cups, or any other external structural elements. The tapered body portions of the protrusions or grooves of the first and second adhesive elements independently have a tapered sidewall having an average angle of taper of about 5° to about 50°.

The first area and the second area are then contacted with each other. This contacting results in a substantial interleaving of the protrusions or grooves of the first adhesive element with the protrusions or grooves of the second adhesive element to provide a reversible adhesive interaction of about 1 N/cm² to about 100 N/cm² between the first and second adhesive elements. Suitably, the first area and second area are provided by applying the adhesive element to the first and second areas such that the protrusions or grooves of the adhesive elements extend away from, and are substantially orthogonal to the areas of the substrate.

In still further embodiments, the present invention provides methods of preparing an adhesive system comprising one or more adhesive elements. Suitably, the methods comprise disposing a moldable material on a substrate. The moldable material is then contacted with a master having a pattern of indentations therein. The moldable material conforms to the three-dimensional shape of the pattern of indentations. The master is then removed from the moldable material to provide an adhesive element including an array of tapered protrusions or tapered grooves on the substrate.

As noted herein, the tapered protrusions or tapered grooves have a base portion attached to the substrate, a tip portion, and a tapered body portion connecting the tip and base portions. Suitable dimensions of the protrusions and grooves are provided herein. The protrusion or grooves are substantially free from barbs, hooks, spirals, loops, seta, spatulae, suction cups, or any other external structural elements. The methods can be repeated so as to prepare additional adhesive elements, or the adhesive elements can be diced so as to provide at least a first adhesive element and a second adhesive element.

Suitably, the moldable material utilized in the preparation methods comprises a thermoelastic polymer having a Tg of about −50° C. to about 200° C. When utilizing such materials, the contacting can comprise heating the moldable material. In other embodiments, the moldable material comprises a UV-curable material, and the contacting can comprise exposing the moldable material to UV light.

In still further embodiment, the present invention provides compositions comprising a first area of a first substrate reversibly adhered to a second area of a second substrate. Suitably, the first area comprises an array of tapered protrusions thereon and the second area comprises an array of tapered protrusions or tapered grooves thereon. The arrays of tapered protrusions or tapered grooves are substantially interleaved so as to provide a reversible adhesive interaction of about 1 N/cm² to about 100 N/cm² between the first and second areas.

Further embodiments, features, and advantages of the present inventions, as well as the structure and operation of the various embodiments of the present invention, are described in detail below with reference to the accompanying drawings.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIGS. 2H-2I show interleaving of tapered protrusions and grooves of the present invention.

FIG. 3A-3I show exemplary tapered protrusions for use in the present invention.

FIGS. 9A-9C show the preparation of an adhesive element of the present invention using thermoelastic materials.

FIGS. 10A-10C show scanning electron micrographs (SEMs) of exemplary adhesive elements in accordance with embodiments of the present invention.

FIGS. 11A-11B show the results of adhesion testing using adhesive elements comprising spike-shaped tapered protrusions made of PDMS.

Figure 1A:
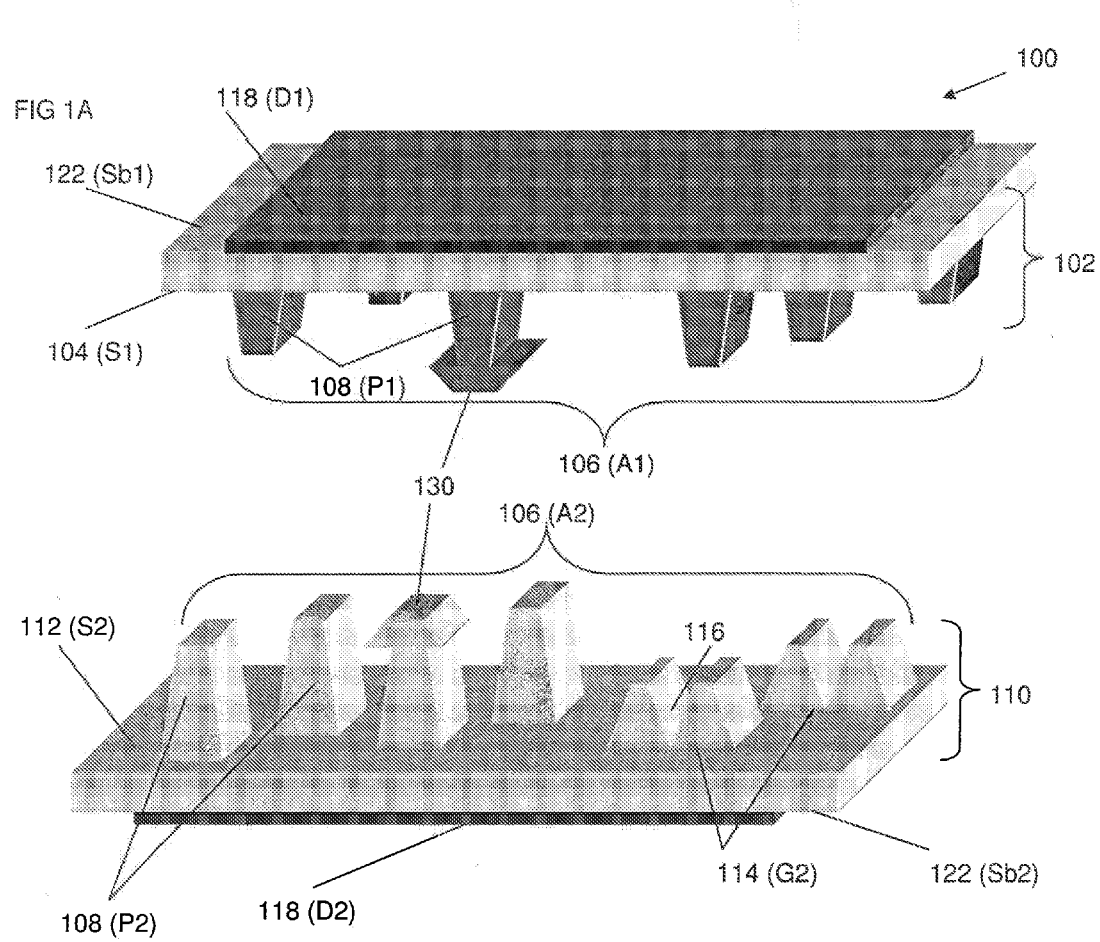
FIGS. 1A-1B show an exemplary adhesive system in accordance with one embodiment of the present invention.

One or more embodiments of the present invention will now be described with reference to the accompanying drawings. In the drawings, like reference numbers can indicate identical or functionally similar elements. Additionally, the left-most digit(s) of a reference number can identify the drawing in which the reference number first appears.

DETAILED DESCRIPTION OF THE INVENTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment," "an embodiment," "an example embodiment," etc., indicate that the embodiment(s) described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Figure 1B:
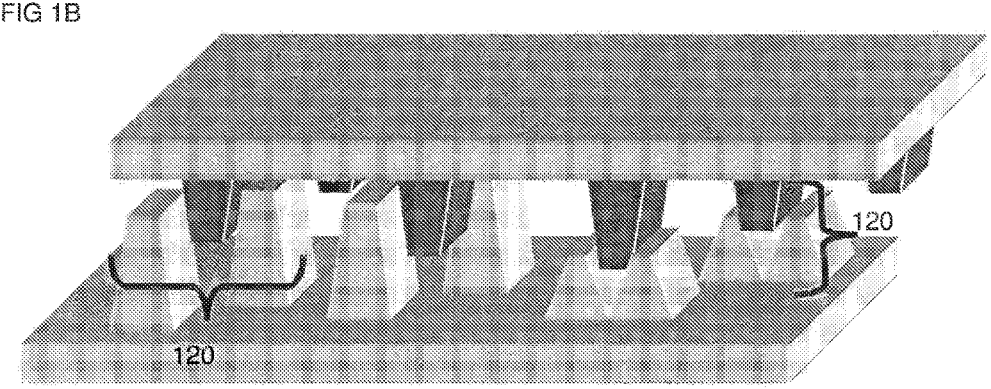

In one embodiment, the present invention provides adhesive systems. An exemplary adhesive system 100 is shown in FIGS. 1A-1B. Such systems comprise a first adhesive element 102, suitably comprising a flexible material. The first adhesive element 102 has a surface 104 (S1), which includes an array 106 (A1) of tapered protrusions 108 (P1). The system comprises a second adhesive element 110 having a surface 112 (S2). Suitably, the surface 112 (S2) includes an array 106 (A2) of tapered protrusions 108 (P2) or tapered grooves 114 (G2). In suitable embodiments, the arrays 106 (A1 and A2) of tapered protrusions 108 (P1 and P2) or tapered grooves 114 (G2) of the first and second adhesive elements 102/110 have a periodicity that is substantially complementary. By contacting the first adhesive element 102 with the second adhesive element 110, a substantial interleaving of the tapered protrusions 108 (P1) of the first adhesive element results, with the tapered protrusions 108 (P2) or tapered grooves 114 (G2) of the second adhesive element, providing a reversible adhesive interaction (FIG. 1B). The present invention can also be expanded to include additional adhesive elements beyond simply first and second elements, based on the same principles described herein, e.g., a third and fourth, fifth and sixth, elements etc.

As used herein, "flexible materials" refer to materials such as polymeric materials, that are able or flex and undergo deformation (i.e., compression, torsional flexing, extension, and the like) in response to an external force. Flexible materials include elastomeric materials (i.e., those that elastically deform and then recover completely, or almost completely, to their original shape/dimensions, after the application of an applied load) as well as plastically deformable materials (i.e., those that deform permanently, or semi-permanently, following the application and release of an applied load). Exemplary flexible materials for use in the adhesive elements of the present invention include, but are not limited to, flexible glasses, flexible metals, various polymers, such as poly(dialkylsiloxanes) (e.g., poly(dimethylsiloxane) (PDMS)), poly(silsesquioxane), polyisoprene, polybutadiene, poly(styrene), poly(acrylamide), poly(butylstyrene), poly(propylene) (PP), poly(ethylene), poly(styrene)-poly(propylene) copolymers, poly(styrene isoprene styrene) copolymers (PSIS), styrene butadiene copolymers (SBC), polychloroprene, acryloxy elastomers, fluorinated and perfluorinated elastomers (e.g., TEFLON®, E. I. DuPont de Nemours & Co., Wilmington, Del.), copolymers thereof, and combinations thereof. Other materials suitable for use as the adhesive elements include those materials disclosed in U.S. Pat. Nos. 5,512,131; 5,900,160; 6,180,239; and 6,776,094, all of which are incorporated herein by reference in their entirety. In some embodiments, the composition of the elastomeric material is substantially homogeneous, though in others, the composition of the elastomeric material has a gradient, or a multi-laminate structure.

Additional materials that can be used as the flexible materials of the adhesive elements include, but are not limited to, saturated elastomers such as ethylene propylene rubber, epichlorohydrin rubber, polyacrylic rubber, silicone rubbers, butadiene rubbers, fluorosilicone rubber, fluoroelastomers, such as VITON® and TECNOFLON®, perfluoroelastomers, tetrafluoro ethylene/propylene rubbers, chlorosulfonated polyethylene, and ethylene vinyl acetate. In further embodiments, unsaturated elastomers such as thermoplastic elastomers, polyurethane, resilin, elastin, polyimides and phenol formaldehyde polymers, can be used in the practice of the present invention. In exemplary embodiments, the first and second adhesive elements, including the protrusions and/or grooves, are biodegradable and thus, able to degrade or break apart in the body into inert substances that are easily passed or cleared. This allows for the use of the adhesive elements of the present invention in biomedical applications, such as wound dressings and sutures, for bone repair and grafts, etc.

Characteristics of some of the materials that can be used in the practice of the present invention are represented below in Table 1.

TABLE 1

Characteristics of Materials for use as Adhesive Elements

| Material | Young's Modulus (MPa) | Tm (° C.) | Tg (° C.) | Surface Energy (mN/m) | Dispersive Component (mN/m) | Polar Component (mN/m) |
|---|---|---|---|---|---|---|
| Polyurethane | 1311-2070 | 75-137 | | | | |
| Polyamide-imide | 4830 | | 275 | | | |
| Nylon PA 6 (50% relative humidity) | 690-1705 tensile | 210-220 | | 46.5 | 32.5 | 14 |
| Polybutylene | 207-276 | 126 | | | | |
| Polysulfone | 2484-2691 tensile | 187-1990 | 187-190 | | | |
| Polyvinylidene Chloride | 345-552 tensile | 172 | −15 | | | |
| Low density polyetheylene (LDPE) | 200 | 120 | | 35.7 | 35.7 | 0 |
| High density polyethylene (HDPE) | 15000 | 130-137 | | 35.3 | 35.3 | 0 |
| Polypropylene (PP) | 900-2000 | 160 | | 30.1 | 30.1 | 0 |
| Poly(ethylene terephthalate) PET | 2000-2500 | 250-260 | | 44.6 | 35.6 | 9 |
| Poly(ethylene oxide) PEO | | | | 42.9 | 30.9 | 12 |
| Polystyrene (PS) | 3000-3500 | 240 | | 40.7 | 34.5 | 6.1 |
| Poly(styrene isoprene styrene) (PSIS) | 0.34-3 | | | | | |

In suitable embodiments, at least one of the adhesive elements (e.g., the first adhesive element) is made from a flexible material, such as an elastomeric material. The second adhesive element can be made from other suitable materials. For example, the second adhesive element can comprise a metal, glass, polymer (including elastomeric materials), ceramic, semiconductors, etc. As discussed herein, the use of a flexible material, including an elastomeric material, for at least one of the adhesive elements allows the tapered protrusions 108 and/or tapered grooves 114 to flex or deform, thereby allowing increased adhesion, even when misalignments occur (discussed below with reference to FIGS. 2B-2G). In further embodiments, both the first and second adhesive elements can comprise the same material, for example the same flexible material (e.g., the same elastomeric material).

In exemplary embodiments, the first and second adhesive elements are electrostatically complementary. "Electrostatically complementary" adhesive elements are suitably generated when the two elements are selected from opposite ends of the triboelectric series. Triboelectric materials exhibit the triboelectric effect—a type of contact electrification in which certain materials become electrically charged after they come into contact with another different material and are then separated (such as through rubbing), thereby generating an electrostatic attraction between the materials. The polarity and strength of the charges produced differ according to the materials, surface roughness, temperature, strain, and other properties. Exemplary materials include dielectrics, ceramics, and polymers. For example, the first adhesive element can comprise nylon and the second adhesive element can comprise teflon. Additional materials include ionomers that can be chemically tailored, to provide bound ionic functionality to control the sign of the charge.

The adhesive elements can be directly prepared from the triboelectric materials (e.g., molded, formed or otherwise generated from the materials), or the adhesive elements can be coated with the triboelectric materials (e.g., via spray coating, painting, dip-coating, etc.). The triboelectric effect thus adds further adhesive force in addition to that generated between the tapered protrusions and/or grooves. The adhesive elements can also be prepared in patterns such that opposing sides of the adhesive elements (i.e., the elements that will adhere to one another) are patterned with electrostatically complementary materials.

Electrostatically complementary materials can also be prepared on flat substrates (i.e., without protrusions), and thus rely solely on the trioelectric effect for adhesion rather than this effect adding to the interaction between the tapered protrusions and/or groves. In such embodiments, a pattern of electrostatically complementary materials is suitably used. Thus, the surface of a first adhesive element can be patterned with a plurality of materials, while the surface of a second adhesive element is patterned with a electrostatically complementary plurality of materials. A maximum adhesive force will result only when the two materials are properly aligned. The level of complexity can be increased, using more intricate patterns, thereby reducing the change of adhesion when optimal alignment is not achieved. The surfaces of the materials can be prepared as described herein.

In further embodiments, the first and second adhesive elements are magnetically complementary. "Magnetically complementary" adhesive elements are those which are attracted to each other via a magnetic force. Suitably, the adhesive elements are prepared from magnetically complementary materials, for example, from a dispersion of magnetic nanoparticles or microparticle platelets. The magnetic particles can be properly aligned prior to polymerization into final adhesive elements. In further embodiments, the adhesive elements can be coated with magnetic materials, or can be magnetized via contact magnetization using a stamp that is patterned in the geometry of the desired magnetic field. The adhesive elements can be prepared in patterns such that opposing sides of the adhesive elements (i.e., the elements that will adhere to one another) are patterned with magnetically complementary materials.

Magnetically complementary materials can also be prepared on flat substrates (i.e., without protrusions), and thus rely solely on magnetic interactions for adhesion rather than this effect adding to the interaction between the tapered protrusions and/or groves. In such embodiments, a pattern of magnetically complementary materials is suitably used. Thus, the surface of a first adhesive element can be patterned with a plurality of materials, while the surface of a second adhesive element is patterned with a magnetically complementary plurality of materials. A maximum adhesive force will result only when the two materials are properly aligned. The level of complexity can be increased, using more intricate patterns, thereby reducing the change of adhesion when optimal alignment is not achieved. The surfaces of the materials can be prepared as described herein.

Figure 2A:
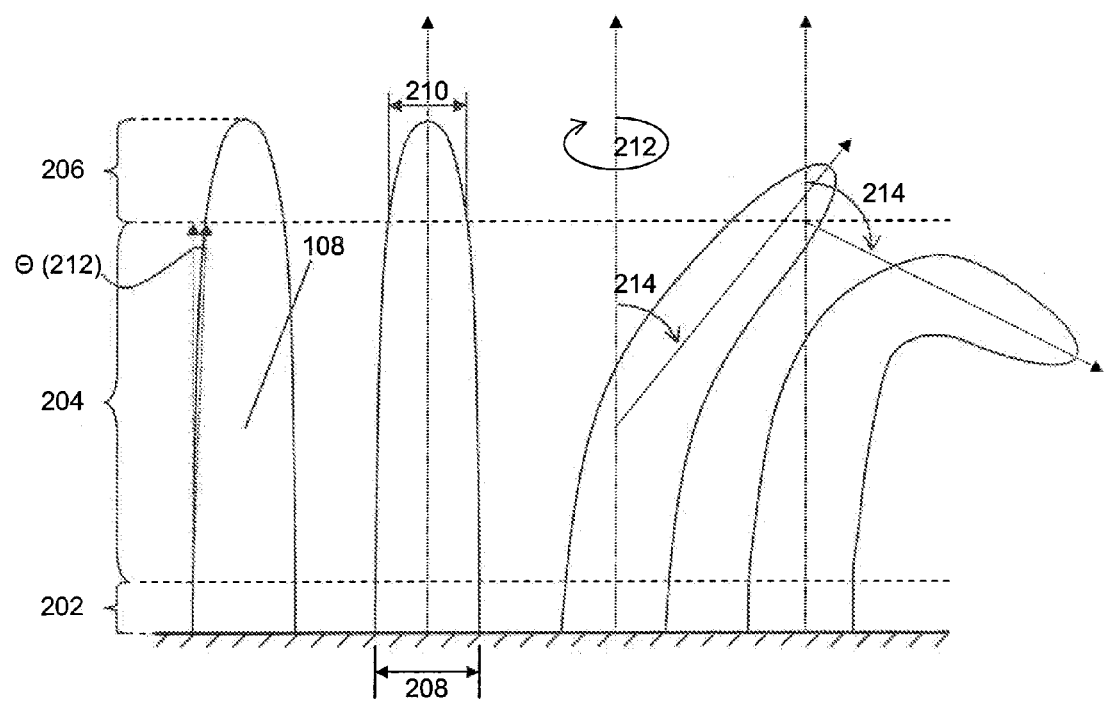
FIG. 2A shows the orientation and characteristics of exemplary tapered protrusions in accordance with one embodiment of the present invention.

As shown in FIG. 1A, the first adhesive element 102, comprises an array 106 (A1) of tapered protrusions 108 (P1). As used herein, an "array" refers to regular or random arrangement of protrusions and/or grooves. Suitably, the protrusions are tapered protrusions 108, though other shaped-protrusions can also be used. "Protrusions" as used herein means structures that extend out or away from the surface of a substrate. In general, the protrusions will be normal to the plane of the surface, though the protrusions can be at any angle relative to the surface (e.g., about 1° to about 90°). "Tapered protrusions" as used herein, refers to structures in which one end of the protrusion is larger (i.e., has a larger surface area and/or lateral dimension) than an opposite end. As shown in FIG. 2A, tapered protrusions 108 suitably comprise a base portion 202 (B1 and/or B2; the designations 1 and 2 are used throughout to refer to the first and second adhesive elements, respectively), a tapered body portion 204 (TB1 and TB2) and a tip portion 206 (T1 and T2).

Suitably, the base 202 of a tapered protrusion 108 has a larger lateral dimension 208 than the lateral dimension of the tip 210 of a tapered protrusion. As used herein, "lateral dimension" refers to the dimension of an article in the plane of the surface (e.g., 104) of the adhesive element. Base portion 202 suitably has a lateral dimension 208 (LD-B1 and LD-B2) of about 500 nm to about 500 μm, about 1 μm to about 500 μm, about 1 μm to about 300 μm, about 1 μm to about 250 μm, about 1 μm to about 100 μm, or about 1 μm to about 50 μm. Suitably, base portion 202 has a lateral dimension 208 of about 50 μm, about 100 μm, about 150 μm, about 200 μm, about 250 μm, about 300 μm, about 350 μm, about 400 μm, about 450 μm, or about 500 μm.

Tapered body portions 204 (TB1 and TB2) have a tapered sidewall. As shown in FIG. 2A, tapered body portions 204 will be tapered such that over the vertical distance of the body portion 204, at least one sidewall (suitably all sidewalls) of the body portion will be tapered with an average angle of taper $\theta$ (212) of about 5° to about 50°, e.g., about 5°, about 10°, about 15°, about 20°, about 25°, about 30°, about 35°, about 40°, about 45°, about 50°, and values in between. As used herein, "about" a value includes a range of 10% around the recited valued. For example, about 10°, includes 9° to 11°.

Tip 210 of tapered protrusions 108 (T1 and T2) has a maximum lateral dimension 210 at the point where the tip portion (T1 and T2) meets the tapered body portion (TB1 and TB2), as shown in FIG. 2A. Suitably, the lateral dimension 210 of the tip 206 of the protrusions and/or grooves (LD-T1, LD-T2) is about 10 nm to about 500 μm, for example, about 20 nm to about 100 μm, about 50 nm to about 100 μm, or about 50 nm to about 50 μm. Suitably, the lateral dimensions of the tip portions (LD-T1 and LD-T2) and base portions (LD-B1 and LD-B2) of the protrusions and/or grooves of the first and second adhesive elements have a dimensional ratio (LD-T1:LD-B1 and LD-T2:LD-B2) of about 1:1 to about 1:5,000, suitably about 1:2 to about 1:5,000, about 1:2 to about 1:2,000, about 1:2 to about 1:1,000, about 1:2 to about 1:500, about 1:2 to about 1:100, or about 1:2 to about 1:50.

FIG. 2A also shows the ability of tapered protrusions 108 to flex and undergo deformation (including plastic and elastic deformation). For example, tapered protrusions 108 can flex torsionally (as shown at 212, for example), can be compressed or elongated, or can be bent (as shown at 214, for example), for example via shear forces. Exemplary tapered protrusions 108 are shown in FIGS. 3A-3I, though the definition of tapered protrusion used herein includes additional structures beyond those shown in FIGS. 3A-3I. Exemplary tapered protrusions 108 include various triangular shapes, pyramids, spikes, cones, hemispherical or parabolic shapes, etc.

"Grooves" as used herein, refers to structures on the surface of an adhesive element that form a furrow or channel. In general, groves are fowled above the surface of the adhesive element, though in other embodiments, grooves can be formed into the surface of the element. "Tapered grooves" as used herein, refers to structures made up of one or more tapered protrusions, positioned in close proximity and/or touching at the base of the protrusions. As shown in FIGS. 1A and 1B, being in such close proximity, the protrusions thereby form tapered grooves 114. Tapered grooves 114 suitably comprise at least two tapered protrusions having a base portion (B1 and/or B2; the designations 1 and 2 corresponding to the first and second adhesive elements), a tapered body portion (TB1 and TB2) and a tip portion (T1 and T2). The outer portions of tapered grooves 114 do not need to be tapered. In embodiments, only the groove portion 116 is tapered so as to allow interleaving with tapered protrusions 108.

Suitably, the base 202 of a tapered protrusion 108 that makes up a tapered groove 114 has a larger lateral dimension 208 than the lateral dimension of the tip 210 of the tapered protrusion. The base portion of the tapered protrusions that make up the tapered grooves suitably has a lateral dimension of about 500 nm to about 500 μm, about 1 μm to about 500 μm, about 1 μm to about 300 μm, about 1 μm to about 250 μm, about 1 μm to about 100 μm, or about 1 μm to about 50 μm. Suitably, the base portion has a lateral dimension of about 50 μm, about 100 μm, about 150 μm, about 200 μm, about 250 μm, about 300 μm, about 350 μm, about 400 μm, about 450 μm, or about 500 μm. As noted above, tapered body portions have at least one tapered sidewall. Tapered body portions of tapered grooves 114 will suitably be tapered, such that over the vertical distance of the body portion, at least one sidewall of the body portion will be tapered with an average angle of taper $\theta$ (212) of about 5° to about 50°. Tip of tapered protrusions that make up tapered grooves 114 have a maximum lateral dimension at the point where the tip portion meets the tapered body portion.

Suitably, at least the tapered body portions 204 (TB1 and TB2) of the first and second adhesive elements have a surface roughness of about one order of magnitude or less than the lateral dimensions 208 (LD-B1 and LD-B2) of the first and second adhesive elements, thus resulting in relatively smooth protrusions and/or grooves, especially along the tapered body portions of the protrusions and/or grooves. As used herein, "surface roughness" refers to the texture of a surface of a tapered body portion, including imperfections, defects, cracks, dimples, etc., that extend away from or into the surface of the tapered body portion. The size of any surface roughness on a tapered body portion will suitably be less than one order of magnitude (i.e., about 10 times smaller) than the lateral dimension of the base of a tapered protrusion and/or tapered groove.

Tapered protrusions 108 and tapered grooves 114 can be of any vertical dimension (nanometers, microns, millimeters, centimeters, meters, etc.). Suitably, tapered protrusions 108 and tapered grooves 114 will extend above the surface 104 of adhesive element 102 a vertical distance of about 500 nm to about 1 mm, suitably about 1 µm to about 500 µm, about 100 µm to about 500 µm, about 100 µm, about 150 µm, about 200 µm, about 250 µm, about 300 µm, about 450 µm, about 400 µm, about 450 µm or about 500 µm.

In exemplary embodiments, tapered protrusions 108 and tapered grooves 114 are formed from the same material as adhesive element 102, including flexible materials such as elastomeric materials. In other embodiments, the tapered protrusions and tapered grooves can be prepared from different materials. Suitably, tapered protrusions and tapered grooves are formed or molded from the same material as the adhesive element by methods described herein, while in other embodiments, the protrusions or grooves can be prepared separately and then added to the adhesive elements. In general, the base 202 (B1), tapered body 204 (TB1) and tip 206 (T1) portions of neighboring protrusions 108 or grooves 114 within an array 106 (A1) of the first adhesive element 102 do not contact each other, i.e., one protrusion or groove does not touch an adjacent protrusion or groove. Similarly, the base (B2), tapered body (TB2) and tip (T2) portions of neighboring protrusions or grooves within the array (A2) of the second adhesive element also do not contact one other. In exemplary embodiments, the protrusions and/or grooves of the first and second adhesive elements will have one or more dimensions that are the same—including vertical dimensions and lateral dimensions of the base and tip, as well as the angle of taper—and thus, in suitable embodiments, the protrusions and/or grooves are substantially identical on both the first and second adhesive elements.

Tapered protrusions 108 and tapered grooves 114 can be formed from any suitable material, such as polymers, pressure sensitive adhesives, metals, ceramics, inorganic materials and the like. Suitably, tapered protrusions and tapered grooves are formed from flexible materials, including elastomeric materials, such as those described herein. For example, tapered protrusions and tapered grooves can comprise optical adhesives (e.g., Norland Optical Adhesive), polymers such poly(dimethylsiloxane) ("PDMS"), poly(styrene isoprene styrene) copolymers (PSIS), and styrene butadiene copolymers (SBC). Suitably, at least one of the protrusions (P1 and P2) of the first and second adhesive elements has a Young's modulus of about 1 MPa to about 100 GPa, suitably about 1 MPa to about 10 GPa, about 2 MPa to about 10 GPa, about 2 MPa to about 1 GPa, about 2 MPa to about 100 MPa, or about 2 MPa to about 10 MPa.

As shown in FIG. 1B, contacting the first adhesive element 102 with the second adhesive element 110 results in substantial interleaving (for example, as shown at 120) of the tapered protrusions of the first adhesive element (P1) and the tapered protrusions of the second adhesive element (P2). Substantial interleaving 120 can also occur between the tapered protrusions of the first adhesive element (P1) and the tapered grooves of the second adhesive element (G2).

As used herein "interleaving" means that the tapered protrusions 108 and/or tapered grooves 114 come together such that they arrange in an alternating pattern, in which a tapered protrusion 108 from the first adhesive element (P1) is arranged next to a tapered protrusion 108 from the second adhesive element (P2), and this pattern is repeated throughout the array. As shown in FIG. 1B, interleaving can also occur between a protrusion 108 from the first adhesive element (P1) and a groove 114 from the second adhesive element (G2). Suitably, "substantial" interleaving will result between the first and second adhesive elements, where enough of the tapered protrusions and/or tapered grooves are interleaved so as to result in an adhesive interaction having a strength of adhesion of about 0.5 Newtons/cm$^2$ to about 1000 Newtons/cm$^2$. Interleaving also requires that the tapered protrusions 108 and/or tapered grooves 114 of the first and second elements are close enough to each other and/or touching so that a surface-to-surface interaction can occur between the protrusions and/or grooves of the different elements. While not wishing to be bound by theory, it is believed that an adhesive interaction results between the protrusions and/or grooves via a non-covalent interaction, including van der Walls forces, hydrogen bonding, dipole-dipole interactions, electrostatic interactions, hydrophobic and/or hydrophilic interactions, etc. In general, a covalent bond is not formed between the protrusions and/or grooves, though in further embodiments, chemical groups can be added to the various structures to allow for such chemical bonding.

In further embodiments, an adhesive interaction can result due to frictional forces generated between the protrusions and/or grooves. For example, a preload force applied to the adhesive elements when brought in contact can be stored as elastic energy, for example by bending or compressing the protrusions and/or grooves against each other, or forcing portions of the protrusions and/or grooves into small spaces. This generates a force normal to the interface between the interleaved protrusions and/or groves that resists sliding or separation of the protrusions and/or grooves.

Interleaving of the tapered protrusions 108 and/or tapered grooves 114 results from the arrangement of the protrusions and groves in the arrays in such a way that they have a periodicity that is substantially complementary. As used herein "periodicity" means the regular arrangement or pattern of the protrusions and/or grooves in the array. By preparing an array of protrusions and grooves such that the patterns of the arrays are complementary, substantial interleaving is able to occur. In exemplary embodiments, the pattern of the protrusions and/or grooves can be arranged in fixed pattern such as a square cell, hexagonal pattern, etc., though in other embodiments, the protrusions and/or grooves can have a completely random arrangement.

Suitably, the arrays are substantially complementary, such that at least about 50% of the protrusions or groves that are desired to be interleaved are aligned to allow interleaving. More suitably, at least about 60% of the protrusions or grooves are aligned, for example, at least about 70%, at least about 75%, at least about 80%, at least about 85%, at least about 90%, at least about 95%, or about 100% of the protrusions or grooves are aligned. It should be noted, that depending on the size of the adhesive elements, their orientation and geometry, a large portion of the total available protrusions may not be aligned, however, a high percentage of those that are desired to be interleaved generally will be aligned. For example, adhesion of a first adhesive element at an angle relative to second adhesive element (e.g., one structure normal to another structure) may not require alignment of all protrusions on both of the elements, only those that are desired to interleave. In exemplary embodiments, sufficient adhesive strength can result between the two elements even if complete alignment is not achieved.

Figures 2B, 2C, 2D, 2E, 2F, 2G:
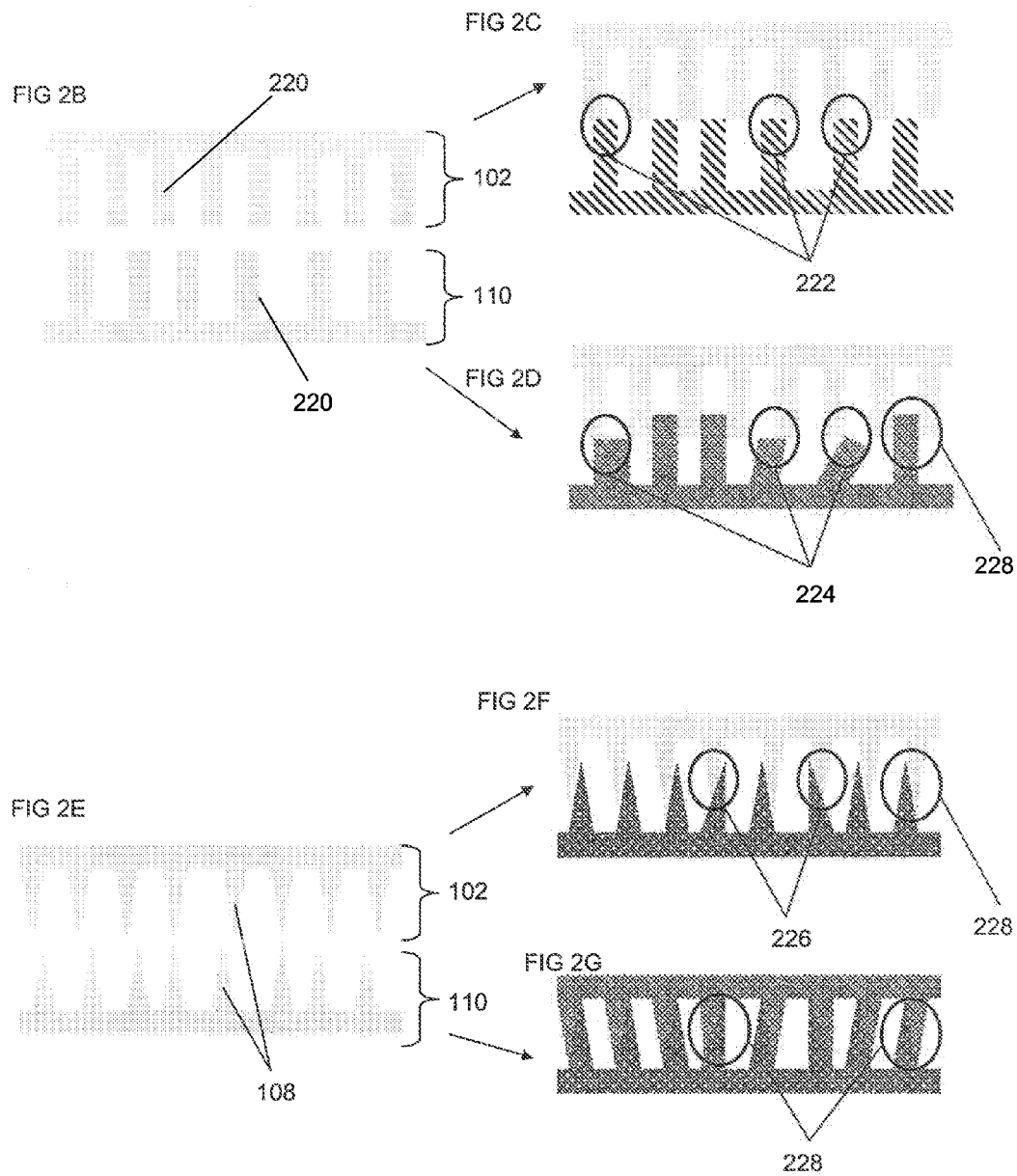
FIGS. 2B-2G show interleaving of flexible and inflexible materials, as well as tapered and non-tapered protrusions.

Use of flexible materials, including elastomeric materials, in forming the tapered protrusions and/or grooves allows for the protrusions/grooves to flex and deform if the arrays are less than 100% complementary. For example, as shown in FIGS. 2B-2G, when using flexible materials, misalignments, which would potentially inhibit interleaving in more rigid materials, are acceptable. The misaligned protrusions/ grooves can simply flex or bend to allow interleaving between the previously-misaligned protrusions/grooves, or simply accommodate the alignment of other protrusions/grooves. In FIG. 2B, a first 102 and a second 110 adhesive element comprising non-tapered protrusions 220 are shown. In FIG. 2C, if misalignments 222 occur, and both of the adhesive elements comprise rigid or hard materials, no or very little interleaving of the protrusions will result, as no deformation or flexing can take place. In FIG. 2D, if one (or even if both) of the adhesive elements comprise flexible materials, some interleaving 228 can occur, as deformation 224 of the protrusions allows for compression, flexing or bending. However, as the protrusions are not tapered, a complete interleaving generally cannot occur.

In contrast, providing adhesive elements 102 and 110, comprising tapered protrusions and/or grooves, as in FIG. 2E, allows for substantial interleaving (for example, as shown at 228) in FIG. 2F, when even only one of the adhesive elements (e.g., the bottom element 110) comprises a flexible material, such as an elastomeric material. The ability of the material to bend or flex allows for acceptable misalignments (for example, as shown at 226), as the material simply deforms to allow other sections to more completely interleave 228. Nearly complete interleaving 228 results if both elements 102 and 110 comprise flexible materials as in FIG. 2G. In this manner, both materials can deform or flex, thereby nearly eliminating any of the hindrance due to misalignment.

Suitably, the interleaving between the tapered protrusions and/or grooves produces a reversible adhesive interaction. A reversible adhesive interaction is an interaction that bonds, sticks or otherwise joins two adhesive elements to each other in a temporary manner such that the adhesive interaction can be reversed by simply separating the two adhesive elements. In suitable embodiments, the first and second adhesive elements are attached to two separate substrates, though in further embodiments, the first and second adhesive elements can be attached to the same substrate as described herein. Reversible adhesive interactions include interactions where there is no or minimal loss of adhesion after one or more adhesion/ de-adhesion cycles, as well as interactions where there is loss of adhesion after one or more cycles. In further embodiments, an irreversible adhesive interaction results. As used herein, an "irreversible adhesive interaction" refers a bond or interaction that is permanent or that cannot be separated (using reasonable methods of separation). In other embodiments, the adhesive interaction can be a one-time interaction (i.e., not capable of being re-adhered using the same adhesive elements), or the adhesive interaction can be a deteriorating interaction, in which the bond deteriorates with each adhesion/de-adhesion cycle, so that ultimately, an adhesive bond cannot be formed.

The strength of the adhesive interaction between the first and second adhesive elements is suitably on the order of about 0.5 Newtons/cm$^2$ (N/cm$^2$) to about 1000 N/cm$^2$, about 1 N/cm$^2$ to about 1000 N/cm$^2$, about 1 N/cm$^2$ to about 500 N/cm$^2$, about 1 N/cm$^2$ to about 400 N/cm$^2$, about 1 N/cm$^2$ to about 300 N/cm$^2$, about 1 N/cm$^2$ to about 200 N/cm$^2$, about 1 N/cm$^2$ to about 100 N/cm$^2$, about 1 N/cm$^2$ to about 75 N/cm$^2$, about 1 N/cm$^2$ to about 50 N/cm$^2$, about 1 N/cm$^2$ to about 25 N/cm$^2$, etc.

Figure 2J:
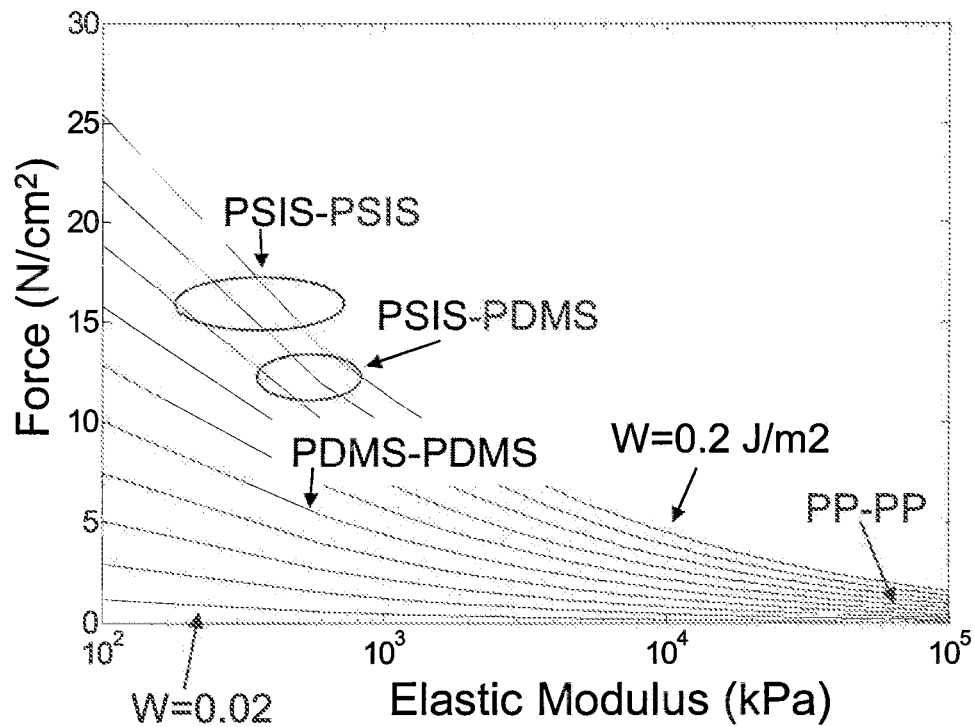
FIG. 2J shows a theoretical model of interactions between adhesive elements.

FIG. 2J shows the results of theoretical modeling of adhesive forces between different materials. The modeling results are based on interactions between cone-shaped protrusions with a height of 10 microns, a radius of 2 microns and perfect interlocking. The model represents materials with elastic modulus between 100 kPa and 100 MPa, and work of separation of 0.02 to 0.2 J/m$^2$. Regions representing theoretical interactions of adhesive elements between poly(styrene isoprene styrene) (PSIS)-PSIS; PSIS-poly(dimethylsiloxane) (PDMS); PDMS-PDMS; and polypropylene (PP)-PP, are represented in FIG. 2J.

Producing adhesive elements that have substantially complementary periodicity, thus allowing for substantial interleaving between the two elements, allows for adhesion between the two elements, but limits or reduces the interaction between the first and/or second adhesive elements and a inert surface. As used herein an "inert surface" refers to surface that does not comprise tapered protrusions and/or tapered grooves with substantially complementary periodicity to an adhesive element. In general, the adhesive interaction between an inert surface and an adhesive element of the present invention will have a force per unit area that is less than 90% of the adhesive interaction between substantially complementary adhesive elements. For example, the adhesive interaction between an inert surface and an adhesive element of the present invention will have a force per unit area that is less than 80%, less than 70%, less than 60%, less than 50%, less than 40%, less than 30%, less than 20%, less than 10%, or less than 5% of the adhesive interaction between substantially complementary adhesive elements.

The adhesive systems of the present invention comprise tapered protrusions 108 and/or tapered groves 114 that are substantially free from additional external structural elements such as barbs, hooks, spirals, loops, seta, spatulae, suction cups, or any other external structural elements. That is, the protrusions and grooves of the present invention are specifically designed and produced to exclude such structures. This includes structural elements that could be added to the protrusions and/or grooves, as well as elements that could be formed directly of the material of the protrusions and/or grooves. "Substantially free" from such external structural elements means that less than 20% of the surfaces of the adhesive elements are covered with the external structural elements. Suitably, less than 15% of the surface area is covered, less than 10%, less than 5%, less than 1%, less than 0.5%, less than 0.1% or about 0% of the surface area is covered with the external structural elements.

The terms "barbs" and "hooks" are used herein to describe structural elements that are on the outside of the protrusions (i.e., external) and/or grooves in the form of a sharp or jutting structure. The terms "hooks," "spirals" and "loops" are used herein to describe structural elements that are on the outside of the protrusions and/or grooves in the form of a sloped, curved, semi-circular or other structure that can form a link or interaction with a similar sloped, curved, semi-circular or other structure.

The terms "seta" and "spatulae" are used herein to refer to the structures commonly associated with gecko feet, for example, as detailed in U.S. Pat. Nos. 6,737,160 and 6,872, 439. The terms "suction cups" refer to structures that rely on the production of a lower atmospheric pressure inside of a cup, bowl or similarly-shaped structure, relative to the higher atmospheric pressure on the outside of the cup, thereby adhering the cup to a surface.

In further embodiments, the tapered protrusions 108 and/or tapered grooves 114, can comprise an interlocking structure 130 as shown in FIG. 1A, positioned on the tops of the protrusions or grooves. The shape of interlocking structure 130 can have be any suitable form, for example, a "mushroom" or "nail-head" structure. In exemplary embodiments, interlocking structures 130 are suitably formed by applying pressure to the tops of the protrusions or grooves, thereby causing the material to flow and form the interlocking structures. The pressure can be applied to protrusions or groves that are in a state such that material flow is possible (i.e., in a plastically deformable state), or the pressure can be applied along with heat so as to deform the materials. For example, the protrusions and/or grooves can be heated, or a heated stamp/plate can be applied that causes the material to deform. Following the deformation, the protrusions and groves can be annealed so as to maintain their deformed state.

It should be noted that the methods of deforming portions of the protrusions and/or groves can also be utilized with no-tapered protrusions, such that a substantially non-tapered protrusion can be prepared with interlocking structures 130. As described herein, in exemplary embodiments both of the complementary tapered protrusions or tapered groves can be prepared from flexible materials. In embodiments where interlocking structures 130 are utilized, one of the tapered protrusions can be prepared from a flexible material, while the other, complementary protrusion and/or grove, can be prepared from a stiff material.

In suitable embodiments, contacting the first and second adhesive elements results in contact of greater than 10% of the total surface area that is desired to be contacted between the first array (A1) and the second array (A2). Suitably, contacting the first and second adhesive elements results in contact of greater than 20%, greater than 30%, greater than 40%, greater than 50%, greater than 60%, greater than 70%, greater than 80%, greater than 90%, or about 100% of the total surface area that is desired to be contacted between the first array (A1) and the second array (A2).

The arrays of the first and second adhesive elements have a surface area that is dictated by the shape, size and geometry of the protrusions and/or grooves thereon. Suitably, when the adhesive elements are contacted with each other, greater than 10% of the total available surface areas of the first and second arrays that are desired to be contacted, are in contact with each other. While in exemplary embodiments, 100% of the surface area of the first and second arrays that are desired to be contacted are in contact with each other, the adhesive elements of the present invention are able to adhere to one another when only a portion (e.g., about 1% to about 100%) of the total available surface areas that are desired to be contacted, are in contact. In general, the larger the contact area (and therefore, the greater the percentage of the total available surface area in contact), the greater the strength of adhesion between the adhesive elements. As shown in FIGS. 2H and 2I, depending on the orientation of the two adhesive elements to be contacted, all of the available surface area of one of the adhesive elements may be utilized during the contacting (see FIG. 2H), though in other embodiments, only a portion of the available surface area of one (or both) of the adhesive elements may be utilized (see FIG. 2I). However, the area that is desired to be contacted (250) suitably will have greater than 10% of the available surface areas in contact.

In additional embodiments, the adhesive systems and compositions of the present invention can comprise one or more liquids between the first (A1) and second arrays (A2). The presence of a liquid between the arrays during contacting can lead to either increased or decreased adhesion. For example, in the presence of an aqueous solution of a lubricant or a surfactant, the adhesive force will generally increase, relative to adhesion in the absence of a liquid. Examples of liquids that can be utilized in the practice of the present invention include, but are not limited to, water, aqueous solutions (including aqueous solutions of lubricants, surfactants or fouling agents), blood, organic solutions, alcohols, etc., and mixtures thereof. Suitably, the liquid can be present on both the first and or second arrays, or just one of a first or second arrays, prior to contacting. In other embodiments, the arrays can be contacted, and then a liquid introduced between the arrays. In further embodiments, the liquid can comprise a polymer precursor that can be polymerized during or after adhesion, thereby increasing the adhesive force between the elements.

In further embodiments, the adhesive systems of the present invention suitably comprise a first adhesive element 102 comprising a flexible material (such as an elastomeric material), as shown in FIGS. 1A-1B. The adhesive element has a surface 104 (S1) including an array 106 (A1) of protrusions (P1) thereon having a surface area (SA1). In exemplary embodiments, the protrusions are tapered protrusions 108. The adhesive systems also comprise a second adhesive element 110 having a surface 112 (S2) including an array 106 (A2) of protrusions (P2) or grooves (G2) thereon. In exemplary embodiments, the protrusions are tapered protrusions 108 and the grooves are tapered grooves 114, as described herein. Exemplary materials, dimensions and other characteristics of the tapered protrusions and tapered grooves are described throughout.

Suitably, the first array of protrusions will have a surface free energy that is complementary to the surface free energy of the second array of protrusions and/or grooves. The "surface free energy" is known to those in the art as the work required to increase the area of a substance by 1 cm$^2$. "Complementary surface free energies" refers to embodiments where the surface free energies of the first adhesive element and the second adhesive element are such that, upon contacting the adhesive elements, a reversible adhesive interaction of about 0.5 N/cm$^2$ to about 1000 N/cm$^2$ results. For example, suitably the surface free energies of the first and second adhesive element are both high (i.e., both high and about the same order of magnitude), such that an adhesive interaction as described herein is able to occur.

As noted above, the protrusions and/or grooves of the first and second adhesive elements are substantially free from barbs, hooks, spirals, loops, seta, spatulae, suction cups, or any other external structural elements. Suitably, contacting the first adhesive element with the second adhesive element results in a substantial interleaving of the arrays (A1 and A2) to provide a reversible adhesive interaction of about 0.5 N/cm$^2$ to about 1000 N/cm$^2$, about 1 N/cm$^2$ to about 1000 N/cm$^2$, about 1 N/cm$^2$ to about 500 N/cm$^2$, about 1 N/cm$^2$ to about 400 N/cm$^2$, about 1 N/cm$^2$ to about 300 N/cm$^2$, about 1 N/cm$^2$ to about 200 N/cm$^2$, about 1 N/cm$^2$ to about 100 N/cm$^2$, about 1 N/cm$^2$ to about 75 N/cm$^2$, about 1 N/cm$^2$ to about 50 N/cm$^2$, about 1 N/cm$^2$ to about 25 N/cm$^2$, etc., between the first and second adhesive elements. As discussed above, the adhesive interaction between an inert surface and an adhesive element of the present invention will have a force per unit area that is less than 90% of the adhesive interaction between substantially complementary adhesive elements. For example, the adhesive interaction between an inert surface and an adhesive element of the present invention will have a force per unit area that is less than 80%, less than 70%, less than 60%, less than 50%, less than 40%, less than 30%, less than 20%, less than 10%, or less than 5% of the adhesive interaction between substantially complementary adhesive elements. Suitably, when the adhesive elements are contacted with each other, greater than 10% of the total available surface areas of the first and second arrays that are desired to be contacted, are in contact with each other.

In addition to being substantially free from the external structural elements noted above, the protrusions or grooves of the first and second adhesive elements are suitably not bent upon themselves. The tips of the protrusions and/or grooves are positioned so as to maximize the vertical height of the protrusions and/or grooves, rather than being bent over to create a hook or barb structure at the tip of the protrusion or groove.

Figure 4:
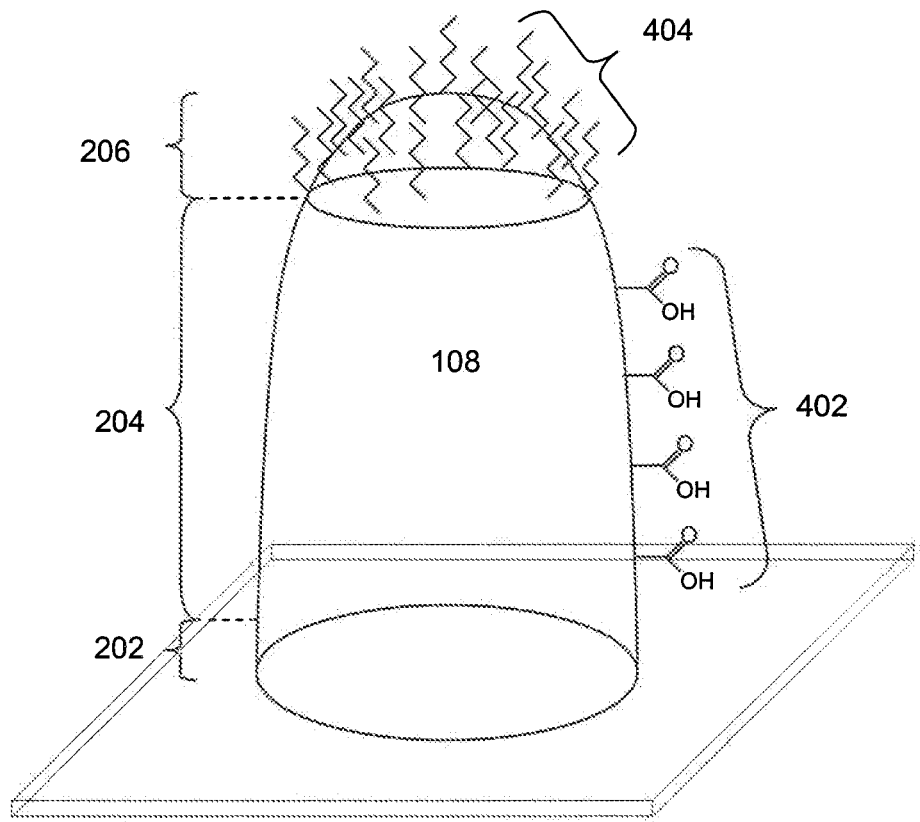
FIG. 4 shows an exemplary tapered protrusion, including functional groups, in accordance with one embodiment of the present invention.

In further embodiments, as shown in FIG. 4, the tapered body portion 204 (TB1) of the tapered protrusions 108 and/or tapered grooves of the first adhesive element includes a first functional group 402 (F1), and the tapered body portion 204 (TB2) of the second adhesive element includes a second functional group 402 (F2). Suitably, the first and second functional groups 402 (F1 and F2) are capable of interacting with one another. For example, an interaction can occur via a non-covalent interaction, a covalent bonding interaction, and combinations thereof. Exemplary non-covalent interactions include hydrogen bonding, electrostatic bonding, dipole-dipole interactions, etc. The addition of functional elements on the tapered body portions of tapered protrusions and/or grooves allow for an increased adhesive interaction between the protrusions and/or grooves.

In further embodiments, tip portions 206 (T1 and T2) of the protrusions or grooves of the first and second adhesive elements include a liquidphobic functional group 404. As used herein, "liquidphobic" functional groups describe, in a general sense, any functional groups that display anti-liquid properties, e.g., functional groups that are one or more of hydrophobic (repels water), lipophobic (repels oils and lipids), amphiphobic (a material that is both hydrophobic and lipophobic), hemophobic (repels blood or blood components) or the like. Such functional groups repel liquids, e.g., by causing the liquid to bead-up on the surface of a protrusion and/or groove and not spread out or wet the surface. Thus, as used herein, a functional group that is described as a liquidphobic functional group includes lipophobic, hydrophobic, and amphiphobic functional groups. Exemplary liquidphobic functional groups are well known in the art and include, but are not limited to, silane agents, heptadecafluorodecyltrichlorosilane, perfluorooctyltriclorosilane, heptadecafluorodecyltrimethoxysilane, perfluoro-dodecyltrichlorosilane, perfluorinated carbon chains (e.g., perfluorooctyl trichlorosilane), polyvinyliden fluoride, polyperfluoroalkyl acrylate, octadecanethiol, fluorine compounds (e.g., graphite fluoride, fluorinated monoalkyl phosphates, $C_4F_8$, etc.), etc. In other embodiments, the liquidphobic structures can comprise fluorocarbons, TEFLON®, silicon polymers (e.g., HYDROLAM 100®), polypropylene, polyethylene, wax (e.g., alkylketene dimers, paraffin, fluorocarbon wax, etc.), plastic (e.g., isotactic polypropylene, etc.), PTFE (polytetrafluoroethylene), diamond and diamond-like surfaces, as well as inorganic materials. Application of a liquidphobic functional group to the tip 206 of a protrusion and/or groove aids interleaving of the protrusions and/or grooves as the tips can slide or maneuver past one another more easily.

Suitably, the adhesive systems and compositions of the present invention are substantially impermeable to a liquid. For example, after contacting the first and second arrays, resulting in a substantial interleaving of the protrusions and/or grooves, an adhesive interaction results that, if contacted with a liquid, will maintain a seal between the two arrays such that liquid is not able, or substantially not able, to permeate the seal. This allows for the preparation of a system that will keep liquids from leaking across the adhered area, thereby providing a liquid tight seal that can either retain liquids, or keep them away from a sealed area.

Figure 5:
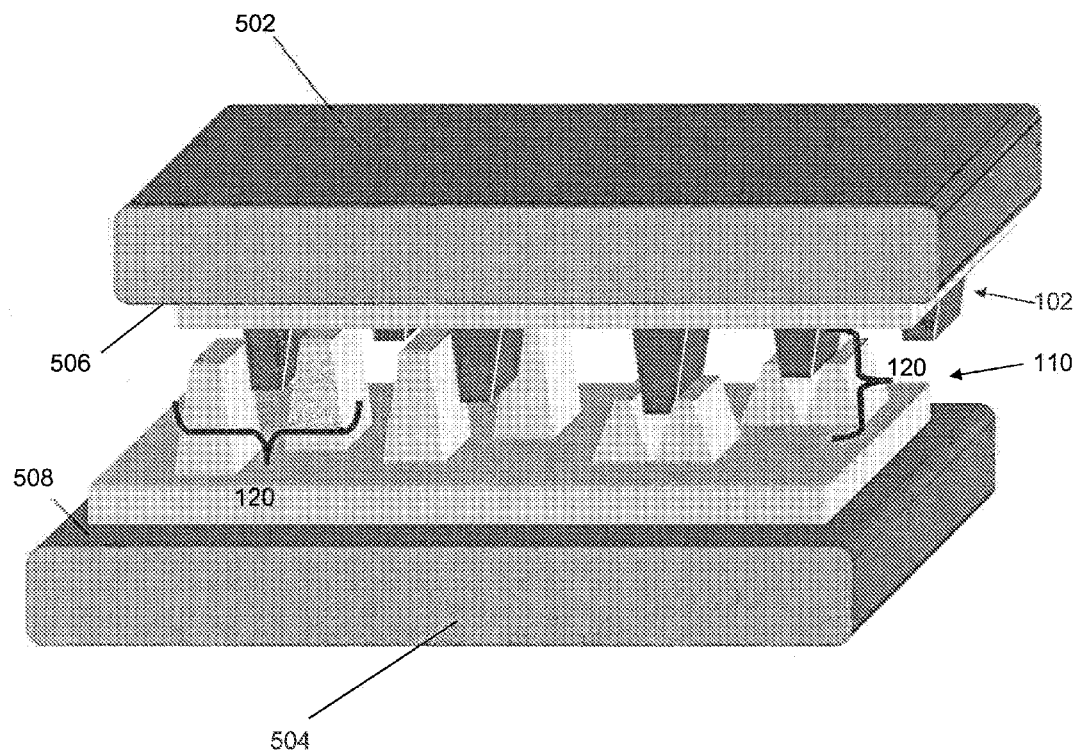
FIG. 5 shows adhesion between two substrates using adhesive elements of the present invention.

In further embodiments, as shown in FIG. 5, the first adhesive element 102 is affixed to a first area 506 of a first substrate 502 and the second adhesive element 110 is affixed to a second area 508 of a second substrate 504. As used herein a "substrate" refers to any material onto which an adhesive element can be attached, secured, bound, disposed or otherwise affixed. Substrates suitable for use with the present invention are not particularly limited by size, composition or geometry. Substrates suitable for use in the present invention are not particularly limited by composition, and include, but are not limited to, metals, alloys, composites, crystalline materials, fibrous materials, amorphous materials, conductors, semiconductors, optics, fibers, glasses, paperboard, ceramics, zeolites, plastics, films, thin films, laminates, foils, polymers, minerals, biomaterials, tissue (both biological and synthetic), bone (both biological and synthetic), and composites thereof and combinations thereof.

In suitable embodiments, the first 102 and second 110 adhesive elements are positioned on the substrates 502/504 such that the protrusions and/or grooves of the first adhesive element substantially interleave 120 with the protrusions or grooves of the second adhesive element to provide a reversible adhesive interaction between the first 506 and second 508 areas of the first 502 and second 504 substrates. In exemplary embodiments, the first 506 and second 508 areas are on the same substrate, while in other embodiments, the first and second areas are on different substrates, and thus, the first and second adhesive elements are affixed to different substrates. Thus, the present invention allows for adhesion between two separate substrates (e.g., articles of clothing, metal, glasses, ceramics, polymers, semiconductors, etc), or two separate portions of the same substrate (e.g., skin to form a suture, etc.).

In further embodiments, as shown in FIG. 1A, the adhesive systems of the present invention comprise an adhesive layer 118 (D1/D2) attached to a second surface 122 (S1b) of the first adhesive element and/or a second surface (S2b) of the second adhesive element. Adhesive layers 118 (D1 and D2) are suitable for affixing the first and second adhesive elements to a substrate 502/504. Adhesive layers 118 (D1 and D2) on the first and second adhesive elements can suitably comprise a wet adhesive layer, a pressure sensitive adhesive layer, a dry adhesive layer, and combinations thereof. In further embodiments, a peelable protective layer (not shown) can cover the adhesive layers 118 (D1 and D2) attached to the second surfaces (S1b and S2b) of the first and second adhesive elements.

The present invention also provides compositions comprising a first area of a first substrate reversibly adhered to a second area of a second substrate. As described herein, suitably, the first area comprises an array (A1) of tapered protrusions (P1) and the second area comprises an array (A2) of tapered protrusions (P2) or tapered grooves (G2). The arrays (A1 and A2) of tapered protrusions (P1 and P2) or tapered grooves (G2) are substantially interleaved, suitably so as to provide a reversible adhesive interaction of about 1 N/cm² to about 1000 N/cm², suitably about 1 N/cm² to about 100 N/cm², between the first and second areas.

In exemplary embodiments, the tapered protrusions (P1 and P2) or tapered grooves (G2) are substantially free from barbs, hooks, spirals, loops, seta, spatulae, suction cups, or any other external structural elements. Suitably, greater than 10%, greater than 20%, greater than 30%, greater than 40%, greater than 50%, greater than 60%, greater than 70%, greater than 80%, or greater than 90%, of the total surface area that is desired to be contacted between the first array (SA1) and the second array (SA2) is reversibly adhered.

Suitably, the arrays comprise flexible materials, such as elastomeric materials as described herein, including those selected from the group consisting of a poly(dialkylsiloxane), a poly(silsesquioxane), a polyisoprene, a polybutadiene, a poly(acrylamide), a poly(alkylstyrene), polychloroprene, an acryloxy elastomer, a copolymer thereof, and combinations thereof. As noted herein, the tapered protrusions (P1 and P2) and tapered grooves (G2) suitably have tip portions (T1 and T2) having a lateral dimension (LD-T1 and LD-T2) of about 50 nm to about 50 µm and base portions (B1 and B2) having a lateral dimension (LD-B1 and LD-B2) of about of about 1 µm to about 100 µm. In exemplary embodiments, the lateral dimensions of the tip portions (LD-T1 and LD-T2) and base portions (LD-B1 and LD-B2) of the protrusions or grooves have a dimensional ratio (LD-T1:LD-B1 and LD-T2:LD-B2) of about 1:2 to about 1:2,000. Suitably, the tapered protrusions (P1 and P2) and tapered grooves (G2) have tapered body portions (TB1 and TB2) having a tapered sidewall with an average angle of taper of about 5° to about 50°.

In exemplary compositions of the present invention, the first and second areas are on different substrates, and in others, the first and second areas are on the same substrate. Exemplary substrates include those described herein, including those selected from the group consisting of a glass, a plastic, a metal, a fiber, a crystal, a mineral, a biological bone, a synthetic bone, a biological tissue, a synthetic tissue, composites thereof, and combinations thereof. As described herein, in exemplary embodiments, the compositions can comprise one or more liquids present between the first and second arrays, such as water, a lubricant, a fouling agent, blood, a surfactant and mixtures thereof. In further embodiments, the compositions are substantially impermeable to a liquid, as described herein.

Figure 6:
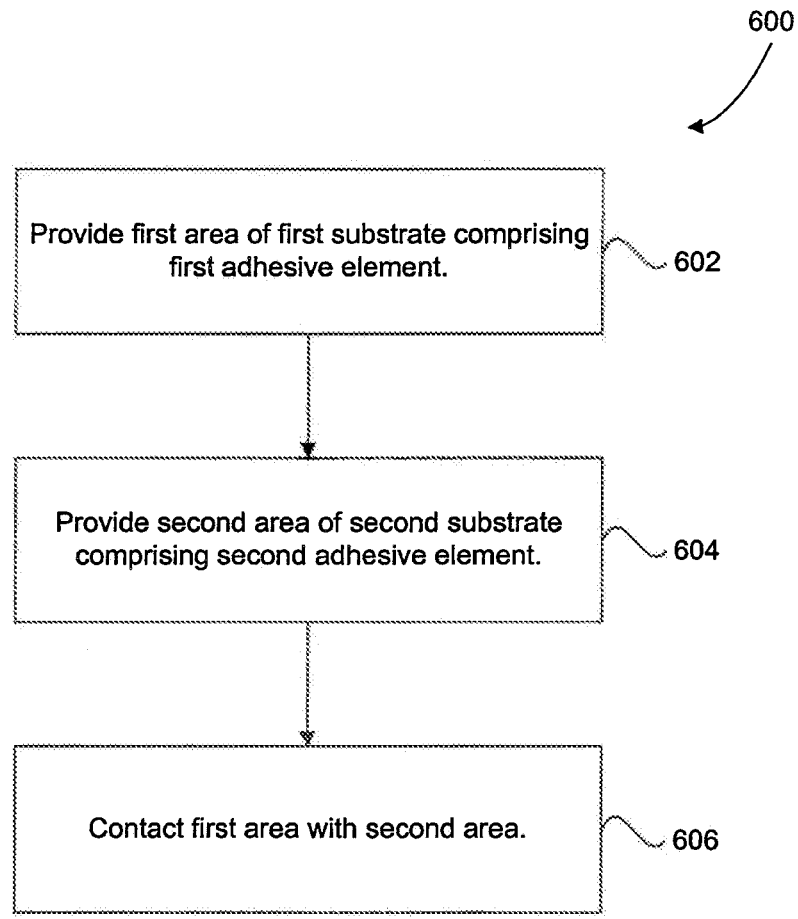
FIG. 6 is a flowchart of a method of adhering two adhesive elements in accordance with one embodiment of the present invention.

The present invention also provides methods of adhering a first area to a second area of a substrate. As shown in flowchart 600 of FIG. 6, suitably, a first area of a first substrate comprising a first adhesive element is provided in step 602. As described herein, suitably the first adhesive element includes an array 106 (A1) of protrusions or grooves, suitably tapered protrusions 108, or tapered grooves 114. The tapered protrusions or grooves have a base portion 202 (B1) attached to the first area, a tip portion 206 (T1) and a body portion, suitably a tapered body portion 204 (TB1), connecting the tip (T1) and base (B1) portions.

In step 604 of flowchart 600, a second area of a second substrate comprising a second adhesive element is provided. As discussed herein, suitably the second adhesive element includes an array 106 (A2) of protrusions or grooves, suitably tapered protrusions 108, or tapered grooves 114. The tapered protrusions or grooves have a base portion 202 (B2) attached to the first area, a tip portion 206 (T2) and a body portion, suitably a tapered body portion 204 (TB2), connecting the tip (T2) and base (B2) portions. As noted herein, suitably the protrusions or grooves of the first and second adhesive elements have a vertical dimension of about 1 µm to about 500 µm. In exemplary embodiments, the base portions (B1 and B2) of the protrusions or grooves of the first and second adhesive elements have a lateral dimension (LD-B1 and LD-B2) of about 1 µm to about 500 µm. Additional dimensions of the protrusions and/or grooves are described throughout.

As set forth above, suitably the protrusions or grooves of the first and second adhesive elements are substantially free from barbs, hooks, spirals, loops, seta, spatulae, suction cups, or any other external structural elements. In addition, the tapered body portions (TB1 and TB2) of the protrusions or grooves of the first and second adhesive elements suitably have at least one tapered sidewall having an average angle of taper of about 5° to about 50°.

In step 606 of flowchart 600, the first area is contacted with the second area. As described herein, contacting the first and second areas results in a substantial interleaving of the protrusions or grooves of the first and second adhesive element with the protrusions or grooves of the second adhesive element to provide a reversible adhesive interaction of about 1 $N/cm^2$ to about 1000 $N/cm^2$, suitably about 1 $N/cm^2$ to about 100 $N/cm^2$ between the first and second adhesive elements.

In exemplary embodiments, the first area and the second areas are on different, separate substrates, though in other embodiments, the first and second areas are on the same substrate. Suitably, the first area is provided by applying the first adhesive element to the first area such that the protrusions or grooves of the first adhesive element extend away from and are substantially orthogonal to the first area of the substrate. This can be accomplished by providing the first adhesive element on a surface (e.g., a surface that can be adhered or affixed to the substrate), and then applying the first adhesive element to the substrate such that the protrusions or grooves extend away in a substantially orthogonal manner. As used herein, substantially orthogonal means about 90° relative to the surface of the first area, though other angles can also be used, for example, the protrusions and/or grooves can extend away at an angle of between about 1° to about 90° relative to the surface, e.g., about 10°, about 20°, about 30°, about 40°, about 45°, about 50°, about 60°, about 70°, about 80°, etc. Suitably, the second area is also provided by applying the second adhesive element to the second area such that the protrusions or grooves of the second adhesive element extend away from and are substantially orthogonal to the second area of the substrate.

In suitable embodiments, one or more substrates that are desired to be adhered together are provided. Adhesive elements of the present invention can then be adhered or affixed to the substrate, and then the substrate(s) adhered to one another. In other embodiments, the substrates can already comprise the adhesive elements. As described herein, the methods of the present invention can be utilized on a single substrate, or two or more separate, independent substrates.

In additional embodiments, the present invention provides methods of preparing an adhesive system comprising one or more adhesive elements. As shown in flowchart 700 of FIG. 7, with reference to the schematics of FIGS. 8A-8D, suitably the methods comprise step 702, where a moldable material 808 is disposed on a substrate 810, as in FIG. 8B. Suitable substrates 810 include polymers, glasses, metals, paperboard, ceramics, and other materials disclosed herein or otherwise known in the art. In embodiments, the moldable material 808 is a thermoelastic material, such as those described throughout.

Figures 8A, 8B, 8C, 8D:
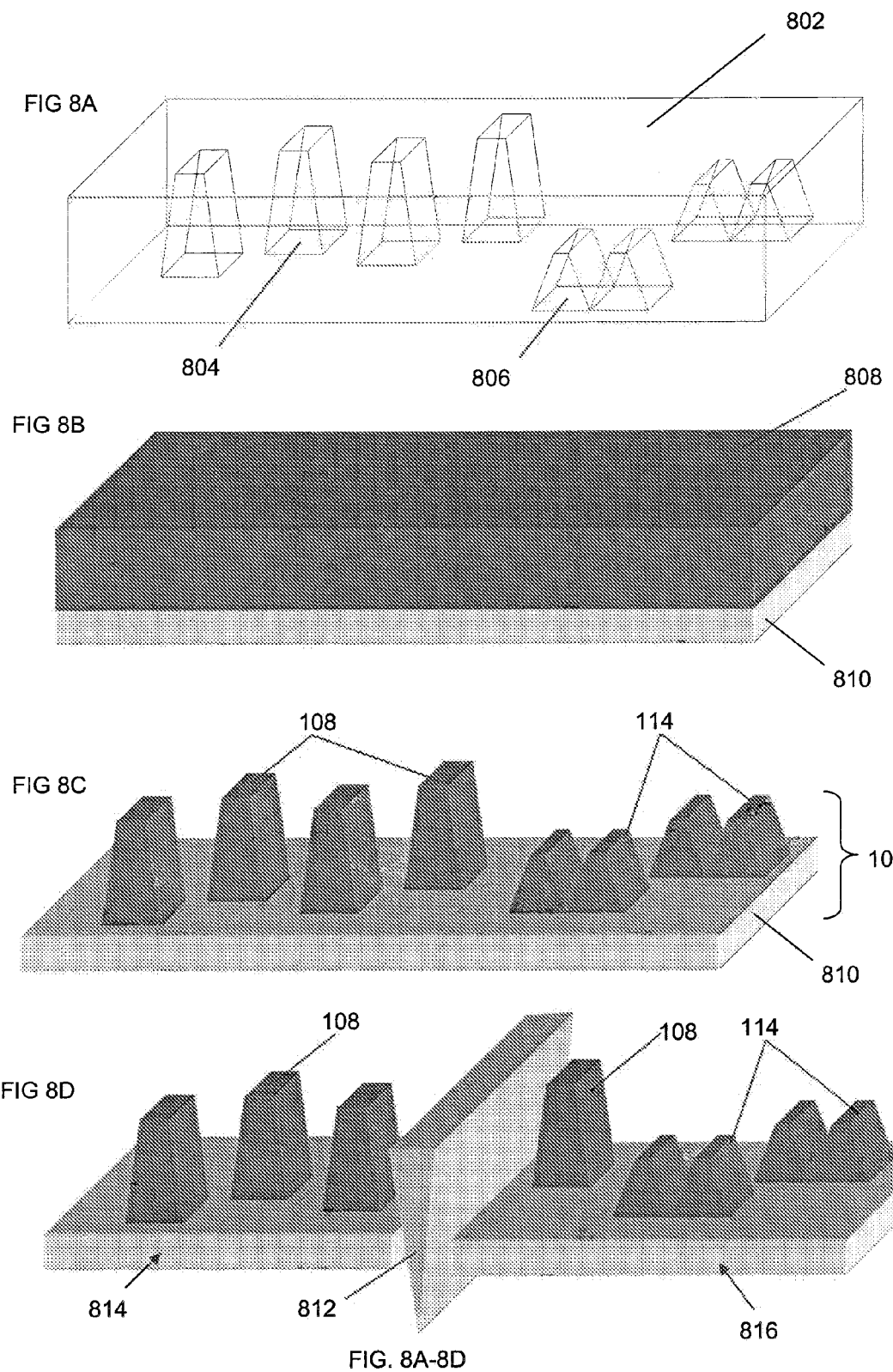
FIGS. 8A-8D show schematics of a method of preparing an adhesive system in accordance with one embodiment of the present invention.

In step 704 of flowchart 700, the moldable material is contacted with a master 802 having a pattern of indentations 804/806 therein, as in FIG. 8A. As used herein, a "master" refers to a template or mold that is used to form the adhesive elements. Suitably, the master 802 comprises indentations in the structure of the master. The pattern of a master is defined by the arrangement and characteristics of the indentations. When the moldable material 808 is contacted with the master 802, the moldable material conforms to the three-dimensional shape of the pattern of indentations.

Figure 7:
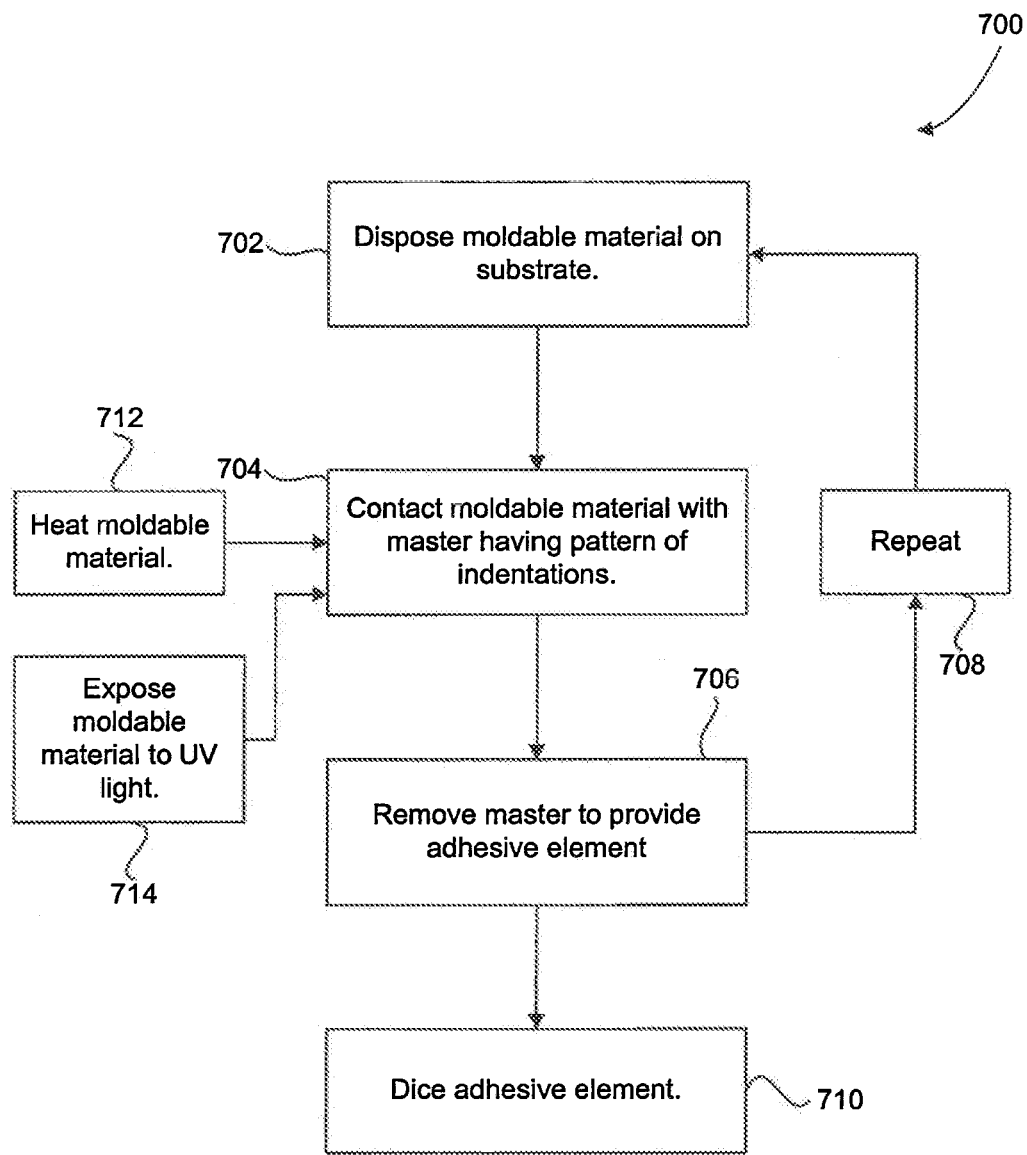
FIG. 7 is a flowchart of a method for preparing an adhesive system in accordance with one embodiment of the present invention.

In step 706 of flowchart 700 of FIG. 7, the master 802 is removed from the moldable material 808. This generates or provides an adhesive element 102, as in FIG. 8C. As noted herein, adhesive elements suitably include an array 106 of tapered protrusions 108 or tapered grooves 114 that were formed by the moldable material 808 filling in the indentations 804/806 of the master 802 during the contacting stage. Tapered protrusions and/or tapered grooves suitably comprise a base portion attached to the substrate 810, a tip portion, and a tapered body portion connecting the tip and base portions. As described herein, suitably the protrusions or grooves have a vertical dimension of about 1 µm to about 500 µm and base portions of the protrusions or grooves have a lateral dimension of about 1 µm to about 100 µm. The tapered body portion of the protrusions have at least one tapered sidewall having an average angle of taper of about 5° to about 50°. In embodiments, the protrusions or grooves are substantially free from barbs, hooks, spirals, loops, seta, spatulae, suction cups, or any other external structural elements.

As shown in flowchart 700, in step 708, suitably the disposing 702, the contacting 704, and the removing 706 are repeated. By repeating the procedure set forth in flowchart 700, additional adhesive elements 102 (e.g., 2, 3, 4, 5, 10, 15, 20, etc.) can be prepared. While in suitable embodiments, an additional moldable material 808 is disposed, in order to produce other adhesive elements, in other embodiments, simply an additional section of the first moldable material is used to prepare the additional adhesive elements.

In additional embodiments, as shown in flowchart 700 with reference to FIG. 8D, adhesive element 102 can be diced in step 710, so as to provide at least a first and second (suitably a third, fourth, fifth, sixth, etc.) adhesive elements (814/816). As shown in FIG. 8D, any suitable cutting element 812 can be used, for example, a blade, a knife, a wedge, a saw, etc., as well as cutting tools such as laser and water cutting tools. As shown in FIG. 8D, by dicing adhesive element 102 into two or more separate adhesive elements, the protrusions and/or grooves are also separated onto different adhesive elements.

As described throughout, in suitable embodiments, the adhesive elements comprise flexible materials, such as elastomeric materials. Thus, disposing of moldable material suitably comprises disposing flexible material, for example an elastomeric material, including a thermoelastic material. Exemplary thermoelastic materials are polymers such as those described herein, and otherwise known in the art, that have a glass transition temperature (Tg) of about −50° to about 200° C. When utilizing a thermoelastic material as the moldable material in the methods of the invention, it is often desirable to heat 712 the moldable, thermoelastic material, during step 704 when the moldable material is contacted with a master. Suitably, the moldable material is heated to a temperature near or above the glass transition temperature, e.g., about −50° C. to about 200° C., so as to facilitate formation of the protrusions and grooves. The moldable material can then be cooled so as to allow hardening of the material, thereby helping it to hold the shapes of the protrusions and grooves.

In further embodiments, the moldable material that is used to form the adhesive elements suitably comprises a material that is curable by ultraviolet light (UV-curable material), and thus hardens when exposed to UV light. Exemplary UV-curable materials include polymers such as UV-curable epoxies, etc. During the contacting step 704 of flowchart 700, the moldable material (a UV-curable material) can be exposed 714 to a source of ultraviolet light, thus causing the material to harden and therefore retain the protrusions and/or grooves from the master, when the master is removed in step 706.

In further embodiments, the adhesive elements of the present invention can be prepared using a process of masking and etching. For example, a substrate can be masked, for example, with a photolithography mask, and then unexposed portions etched so as to form protrusions and/or groves in the substrate. In further embodiments, a polymeric material that has a crystalline form that is resistant to etching can also be used to foam the protrusions and grooves. As used herein, the terms "etch" or "etching" refer to any process, including chemical, physical, or energetic, which removes exposed or uncovered material of a substrate.

Examples of suitable etching methods include, but are not limited to, chemical etching, such as acid or base etching, including wet chemical etches (e.g., using Acetic Acid ($CH_3COOH$), Hydrochloric Acid (HCl), Hydrofluoric Acid (HF), Nitric Acid ($HNO_3$), Phosphoric Acid ($H_3PO_4$), Potassium Hydroxide (KOH), Sodium Hydroxide (NaOH), Sulfuric Acid ($H_2SO_4$), as well as other chemicals known by one of ordinary skill in the art, see e.g., U.S. Pat. Nos. 7,153,782, 7,115,526, 5,820,689); photochemical etching, see e.g., U.S. Pat. Nos. 4,414,066 and 5,092,957, as well as Ashby, "Photochemical Dry Etching of GaAs", *Appl. Phys. Lett.* 45:892 (1984); Ashby et al., "Composition-selective Photochemical Etching of Compound Semiconductors", *Appl. Phys. Lett.* 47:62 (1985), Smith, R. A., Semiconductors, 2nd Ed., Cambridge Univ. Press, New York, 1978, p. 279; plasma etching, see e.g., U.S. Pat. Nos. 3,615,956, 4,057,460, 4,464,223 and 4,595,454; reactive ion etching (RIE) see e.g., U.S. Pat. Nos. 3,994,793, 4,523,976 and 4,599,136; electron beam etching, see e.g., U.S. Pat. Nos. 4,639,301, 5,149,974 and 6,753,538, and also, Matsui et al., "Electron Beam Induced Selective Etching and Deposition Technology," Journal of Vacuum Science and Technology B 7 (1989), Winkler et al. "E-Beam Probe Station With Integrated Tool For Electron Beam Induced Etching," *Microelectronic Engineering* 31:141-147 (1996). Each of the patents and references listed above are hereby incorporated by reference herein in their entireties for all purposes, specifically for their disclosure of various etching methods and compositions.

Applications for the various methods and systems of the present invention, are well known to those of ordinary skill in the art, and include, but are not limited to, electronics, displays, photovoltaics, light emitting diodes, lighting, optics, consumer products, batteries, semiconductors, fuel cells, antennas, curved surfaces, cell biology, medical applications, proteomics, diagnostics, sensors, etc.

EXAMPLES

Example 1

Preparation of Adhesive Elements

Adhesive elements of the present invention have been prepared using both thermoelastic materials as well as UV-curable materials. Exemplary thermoelastic materials that have been utilized in the disclosed methods include polystyrene, polypropylene, polybutadiene copolymers and polyisoprene copolymers. Exemplary UV-curable materials that have been used in the disclosed methods include poly(mercapto-esters).

As shown in FIGS. 9A-9C, a thermoelastic material 904 is disposed on a substrate 906. As shown in FIG. 9A, the thermoelastic material can be in the form of solid pellets. The substrate 906 is heated, and the thermoelastic material 904 is contacted with a master 902 (e.g., a PDMS stamp). As shown in FIG. 9A, master 902 suitably comprises indentations 908 forming a pattern in the master. Under the application of pressure (e.g., about 10 N/cm$^2$) and heat (e.g., near or above Tg of the thermoelastic material), the thermoelastic material conforms to the three-dimensional shape of the pattern of indentations 910. After cooling and then removal of master 902 in FIG. 9C, the thermoelastic material has formed an array of protrusions 912, suitably tapered protrusions, that form an adhesive element of the present invention.

Figures 9D, 9E, 9F:
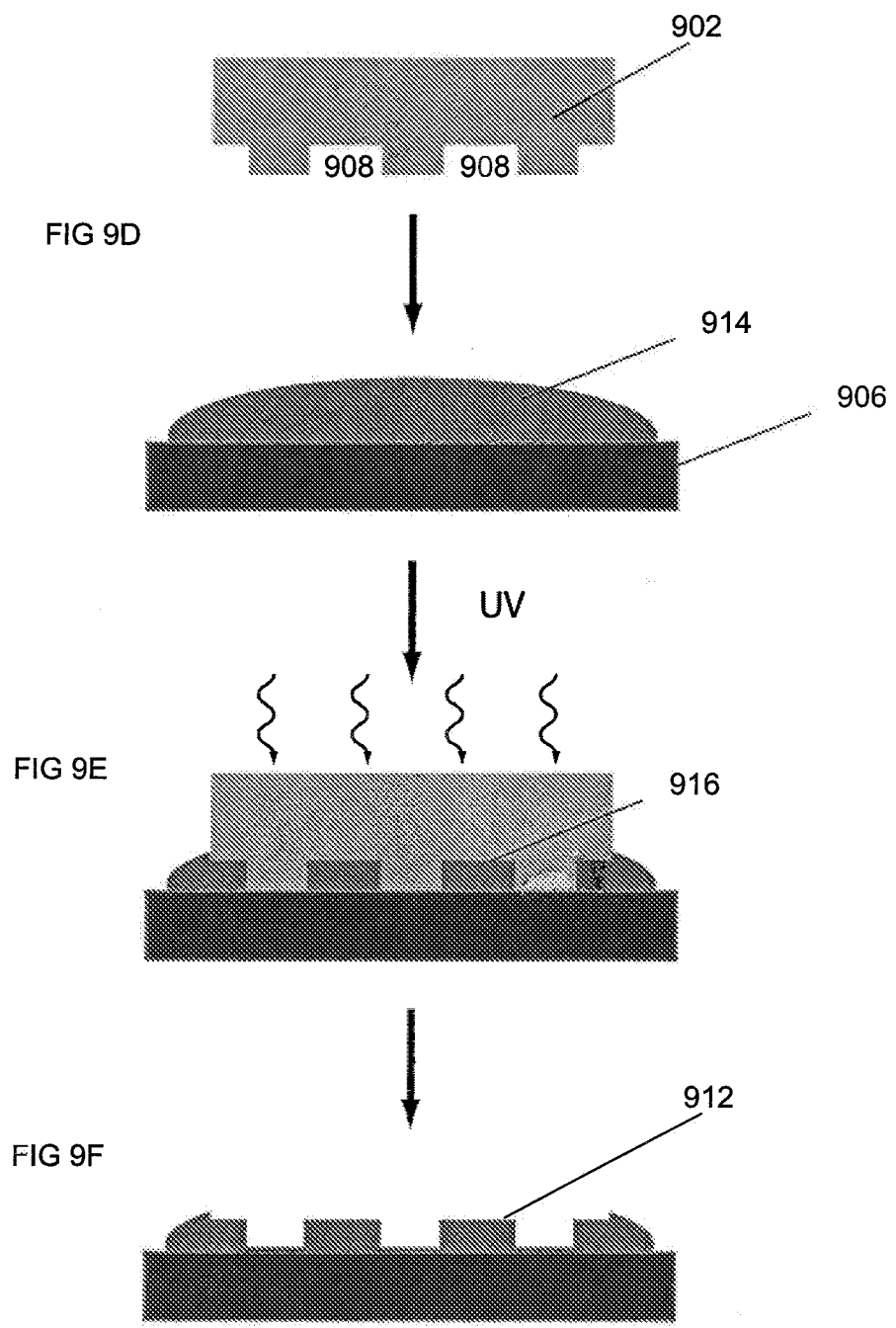
FIGS. 9D-F show the preparation of an adhesive element of the present invention using UV-curable materials.

FIGS. 9D-9E show the formation of an adhesive element using UV-curable materials (e.g., Norland Optical Adhesives (poly mercapto-esters)). In FIG. 9D, a UV-curable material 914 is disposed on substrate 906 (e.g., paperboard). A master 902 (e.g., a PDMS stamp) comprising indentations 908 is then contacted with the UV-curable material. As shown in FIG. 9E, as the UV-curable material conforms to the three-dimensional shape of the pattern of indentations 916, the material is exposed to UV light. This cures the material, such that after removal of master 902, an array of protrusions 912, suitably tapered protrusions, form an adhesive element of the present invention.

FIGS. 10A-10C show scanning electron micrographs (SEMs) of tapered protrusions of the adhesive elements formed using the methods disclosed herein. FIG. 10A shows triangular-shaped protrusions extending throughout the width of the element as peaks and troughs. FIG. 9B shows spike-shaped protrusions, while FIG. 9C shows protrusions that resemble cones. Base 202, tapered body 204, and tip 206 portions of all three sets of tapered protrusions can be seen in FIGS. 10A-10C.

Example 2

Measurement of Adhesive Interactions

Adhesive elements prepared according to the methods described herein were tested for their adhesion to complementary structures having the same composition and shape, as well as structures having different structural geometries and compositions.

Table 2 below shows the material characteristics of three adhesive elements prepared from three different commercially available polymers (Norland Optical Adhesive (NOA) 63, 72 and 68 (poly mercapto-esters) (Norland Products, Inc., Cranbury N.J.)), as well as poly(dimethylsiloxane) (PDMS). It should be noted that the characteristics of the commercially available polymers may differ depending on the measurement methods, as well as the methods of preparing the polymers (including curing times and compositions used).

TABLE 2

Materials Characteristics of Adhesive Elements

| Polymer 1 (e.g., NOA 63) | |
|---|---|
| Elongation at Failure | 6% |
| Modulus of Elasticity (MPa) | 1655 |
| Tensile Strength (MPa) | 34.5 |
| Hardness - Shore D | 90 |
| Polymer 2 (e.g., NOA 72) | |
| Elongation at Failure | 3% |
| Modulus of Elasticity (MPa) | — |
| Tensile Strength (MPa) | 5.5 |
| Hardness - Shore D | 75 |
| Polymer 3 (e.g., NOA 68) | |
| Elongation at Failure | 80% |
| Modulus of Elasticity (MPa) | 140 |
| Tensile Strength (MPa) | 17.2 |
| Hardness - Shore D | 60 |
| PDMS | |
| Elongation at Failure | 160% |
| Modulus of Elasticity (MPa) | 1 |
| Tensile Strength (MPa) | 2.1 |
| Hardness - Shore D | 60 |

Tables 3-6 below show the results of experiments measuring the adhesive interaction between various tapered protrusions prepared from Norland Optical Adhesive (NOA) 63, 68, 72 (poly mercapto-esters) (Norland Products, Inc., Cranbury, N.J.) as well as PDMS and PSIS, as indicated. Adhesive interactions were measured using an adhesive element with a size of about 1 cm$^2$, by applying a pre-load of between 1-40 N, and then separating the adhesive elements at a rate of 5 mm/min, until failure of the adhesion.

The results in Table 3 below show the adhesion of tapered protrusions made from different polymers using minimal alignment and a 10 N or 15 N preload. As noted, the flexible materials (PDMS and PSIS) allow for interleaving, and thus adhesion, whereas the rigid materials (NOA 68, 73 and 63) do not adhere to each other as well (if at all).

TABLE 3

Maximum Adhesion (N/cm2)

| Shape/Preload | Polymer 1 (e.g., NOA 68) | Polymer 2 (e.g., NOA 73) | Polymer 3 (e.g., NOA 63) |
|---|---|---|---|
| PDMS | | | |
| V-grooves/Triangles at 10 N preload | 0.046 | 0 | 0 | 0 |
| Spikes at 15 N preload | 0.45 | 0 | 0 | 0.02 |
| PSIS | | | |
| Cones at 15 N preload | 0.48 | 0 | 0 | 0 |

Subsequent experiments were performed using hand alignment with different shaped protrusions of PDMS and PSIS as indicated. Tables 4-5 show the results of 8-10 trials, showing the separation force required to separate the adhesive elements, as well as the adhesion force between them. Trials were performed using the same adhesive elements, and thus trials 1-8 and 1-10 represent repeated loading and separation of the same elements.

TABLE 4

PDMS Grooves/Triangles with Hand Alignment (10 N Preload)

| Trial | Separation Force (N) | Area (cm$^2$) | Adhesion (N/cm$^2$) |
|---|---|---|---|
| 1 | 8.11 | 9.7 | 0.84 |
| 2 | 7.6 | 9.7 | 0.79 |
| 3 | 8.66 | 9.7 | 0.89 |
| 4 | 6.55 | 9.7 | 0.68 |
| 5 | 11.99 | 9.7 | 1.24 |
| 6 | 9.18 | 9.7 | 0.95 |
| 7 | 15.18 | 9.7 | 1.57 (max) |
| 8 | 8.38 | 9.7 | 0.86 |
| Average | 9.46 | 9.7 | 0.97 |

TABLE 5

PDMS Cones with Hand Alignment (15 N Preload)

| Trial | Separation Force (N) | Area (cm$^2$) | Adhesion (N/cm$^2$) |
|---|---|---|---|
| 1 | 1.21 | 2.8 | 0.43 |
| 2 | 0.89 | 2.8 | 0.32 |
| 3 | 3.35 | 2.8 | 1.2 |
| 4 | 4.2 | 2.8 | 1.5 |
| 5 | 4.67 | 2.8 | 1.67 |
| 6 | 2.56 | 2.8 | 0.92 |
| 7 | 2.24 | 2.8 | 0.8 |
| 8 | 2.51 | 2.8 | 0.9 |

TABLE 5-continued

PDMS Cones with Hand Alignment (15 N Preload)

| Trial | Separation Force (N) | Area (cm²) | Adhesion (N/cm²) |
|---|---|---|---|
| 9 | 4.44 | 2.8 | 1.59 |
| 10 | 5.04 | 2.8 | 1.8 (max) |
| Average | 3.11 | 2.7 | 1.11 |

TABLE 6

PSIS Spikes with Hand Alignment (15 N Preload)

| Trial | Separation Force (N) | Area (cm²) | Adhesion (N/cm²) |
|---|---|---|---|
| 1 | 6.14 | 2.4 | 2.56 (max) |
| 2 | 2.25 | 2.4 | 1.05 |
| 3 | 2.37 | 2.4 | 0.99 |
| 4 | 0.23 | 2.4 | 0.1 |
| 5 | <0.2 | 2.4 | <0.1 |
| 6 | <0.2 | 2.4 | <0.1 |
| 7 | <0.2 | 2.4 | <0.1 |
| 8 | <0.2 | 2.4 | <0.1 |
| 9 | <0.2 | 2.4 | <0.1 |
| 10 | <0.2 | 2.4 | <0.1 |
| Average | 1.25 | 2.4 | 0.52 |

The low separation force for the PSIS spikes with 15N preload following the first trial are a result of a low preload, and deterioration/damage to the spikes during repeated loading and separation.

Table 7 further demonstrates results of adhesion between flexible, elastomeric materials that can flex and deform, including (PDMS), poly(styrene isoprene styrene) copolymer (PSIS) and styrene butadiene copolymer (SBC). "Overnight" samples were stored for greater than 12 hours before they were separated, thus leading to increased adhesion, most likely due to polymer creep.

TABLE 7

Adhesive Characteristics - Elastomeric Materials

| Material | Structure of Adhesive Element | Tested Against | Adhesion (N/cm²) |
|---|---|---|---|
| PDMS | V-grooves | Self | 1.57 |
| PDMS | Spikes | Self | 2.23 |
| PDMS | Cones | Self | 1.8 |
| PDMS | Posts | Glass | <1 |
| PDMS | Posts with Wide Spacing | Self | <1 |
| PDMS | Posts with Wide Spacing | Glass | <1 |
| PDMS | Posts with Wide Tops | Glass | 2.79 |
| PDMS | Tacky Posts | Glass | 4.63 |
| PDMS | Flat | Self | 2.375 |
| PSIS | V-Grooves | Self | 2.38 |
| PSIS | Overnight V-Grooves | Self | >5 |
| PSIS | Spikes | Self | 2.56 |
| PSIS | Overnight Spikes | Self | >3 |
| PSIS | Cones | Self | 0.44 |
| PSIS | Posts | Glass | <1 |
| PSIS | Flat | Self | 1.06 |
| SBC | Posts | Glass | 3.114 |
| SBC | Flat | Self | 1.47 |

FIGS. 11A-11B show the results of adhesion testing using adhesive elements comprising spikes of PDMS. In FIG. 11A, the pre-load dependence of adhesion is shown. As can be seen, if a higher load is applied when the adhesive elements are initially contacted (pre-load on x-axis), an increased adhesion between the two surfaces results (adhesion on y-axis). FIG. 11B shows the rotational dependence of alignment on adhesion. As can be seen, an optimal alignment, theta, results when the two adhesive elements are aligned in such a way that maximum adhesion results (e.g., about 170°-180° in the example shown).

Example 3

Measurement of Adhesive Interactions in the Presence of Liquid Contaminants

Adhesive elements prepared according to the methods described herein were also tested for their adhesion to complementary structures in the presence of various liquid contaminants. Table 8 below present the results of these adhesion tests showing the separation force required to separate the adhesive elements, as well as the adhesion force between them. The adhesive elements were pre-loaded by hand (>100 N) prior to separation.

TABLE 8

Adhesion in the Presence of Liquid

| Liquid | Separation Force (N) | Area (cm²) | Adhesion (N/cm²) |
|---|---|---|---|
| None | 1.43 | 2.4 | 0.60 |
| None | 1.28 | 2.4 | 0.53 |
| None | 1.34 | 2.4 | 0.56 |
| Ethanol | 0.97 | 2.4 | 0.4 |
| Ethanol | 0.58 | 2.4 | 0.24 |
| Ethanol | 0.53 | 2.4 | 0.22 |
| None | 1.75 | 2.4 | 0.73 |
| Water | 2.42 | 2.4 | 1.01 |
| Water | 2.68 | 2.4 | 1.12 |
| Water | 1.95 | 2.4 | 0.81 |
| None | 1.83 | 2.4 | 0.76 |
| Ethylene Glycol | 4.47 | 2.4 | 1.86 |
| Ethylene Glycol | 5.26 | 2.4 | 2.19 |
| Ethylene Glycol | 4.02 | 2.4 | 1.68 |
| None | 1.68 | 2.4 | 0.70 |
| Water + Surfactant | 5.81 | 2.4 | 2.42 |
| Water + Surfactant | 5.92 | 2.4 | 2.47 |
| Water + Surfactant | 5.24 | 2.4 | 2.18 |

Figure 12:
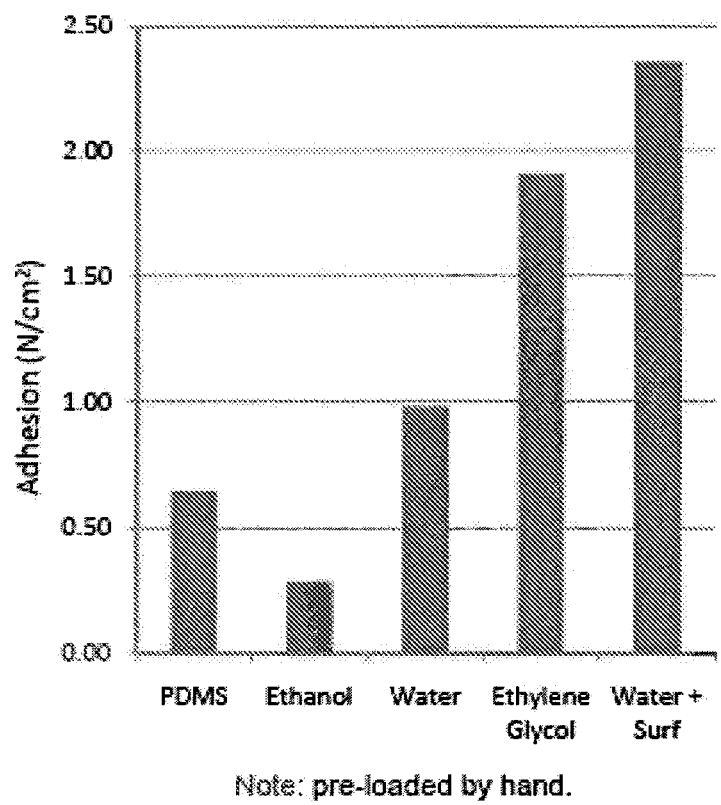
FIG. 12 shows the results of adhesion testing using adhesive cones in the presence of various liquid contaminants.

FIG. 12 shows the results of adhesion (average) for adhesive elements in the presence of the liquid contaminants. As shown, the presence of ethanol actually reduces the adhesive interaction between PDMS cones below that of a "dry" system, whereas each of water, ethylene glycol and water plus a surfactant increase the adhesion to varying degrees.

Example 4

Introduction of Noise into Adhesive Structures

Figure 13A:
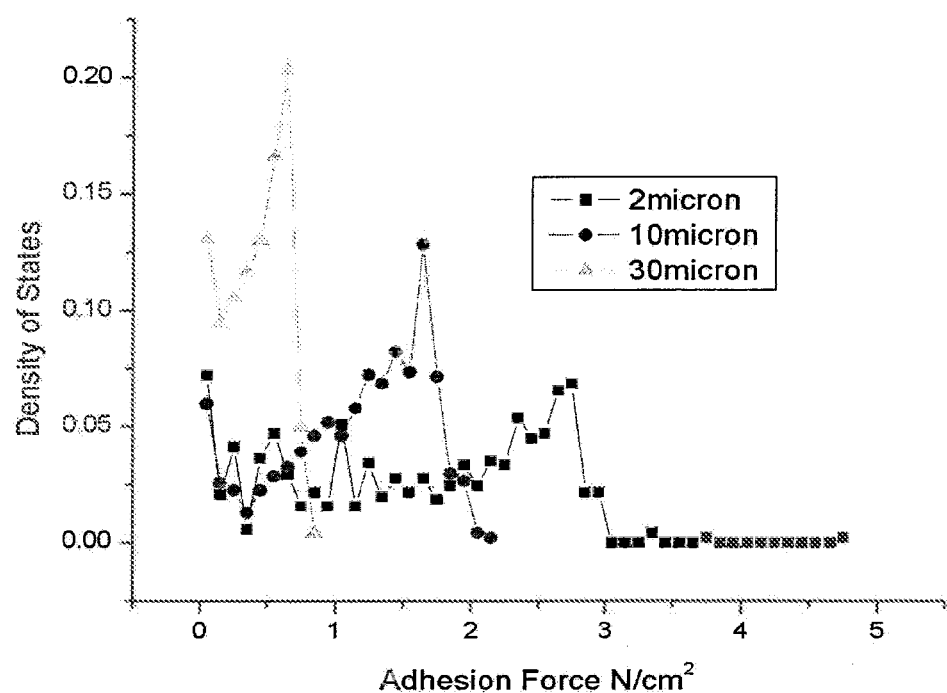
FIG. 13A shows the distribution of adhesive forces between exemplary adhesive elements.
Figure 13B:
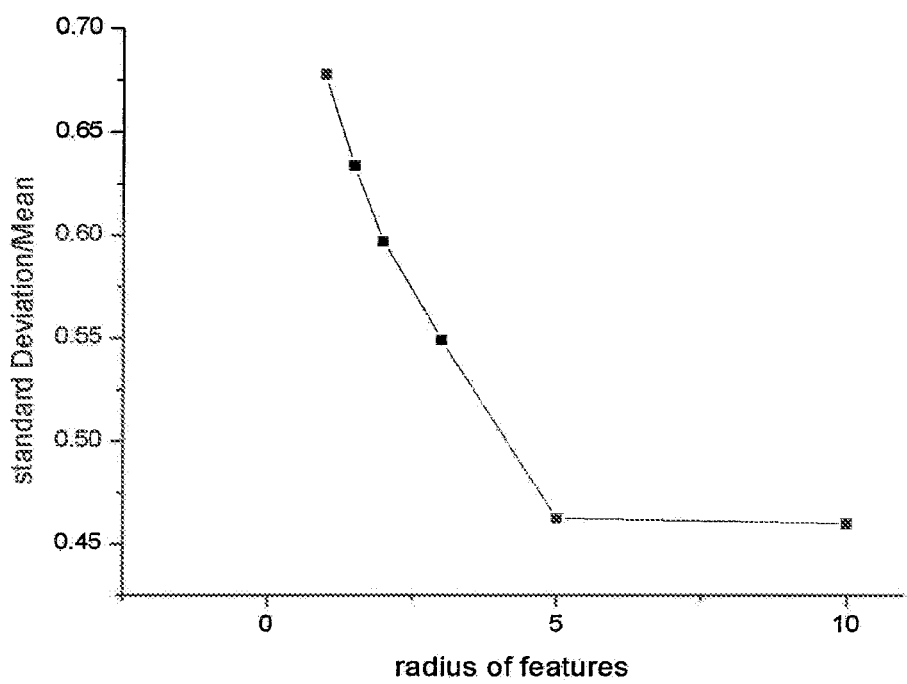
FIG. 13B shows the standard deviation of adhesive force versus the radius of adhesive elements.

Adhesive elements prepared according to the methods described herein can exhibit variability in adhesion strength from one preparation to the next or from one separation to another. In addition, while the use of smaller feature sizes gives a higher maximum adhesion, the spread of adhesion strengths is also much greater. For example, as shown in FIG. 13A, adhesion increases with decreasing diameter of the protrusions. The results shown in FIG. 13A represent simulations based on cone-shaped protrusions with a height of 10 micros, a pitch (angle of taper) of 2× radius, and a base diameter of either 2 microns, 10 microns or 30 microns. While the protrusions with a base diameter of 2 microns show the highest adhesion force achievable, the variability of adhesive forces obtained is also spread across a wide range. As shown in FIG. 13B, the standard deviation of adhesion increases with decreasing feature size.

While perfect alignment of the adhesive elements described throughout leads to adhesion over a large number of features, a small amount of misalignment can lead to features decreasing in binding strength. In order to decrease the amount of misalignment, thereby reducing the impact on the positive binding interactions, noise is suitably introduced into the adhesive systems.

As used herein "noise" refers to variations in the size and separation of the adhesive elements, i.e., in the dimensions of the protrusions and/or grooves, as well as their spacing. For example, over the surface of an adhesive element, variations can be introduced into the protrusions such that the radius of the protrusions (e.g., as cones) and the separation, varies by about 0% to about 10% over the population of protrusions. This percent variation is referred to herein as "noise," and thus, the adhesive elements can be produced with about 0% to about 10% noise, suitably, about 1%, about 2%, about 3%, about 4%, about 5%, about 6%, about 7%, about 8%, about 9% or about 10% noise.

Figure 14A:
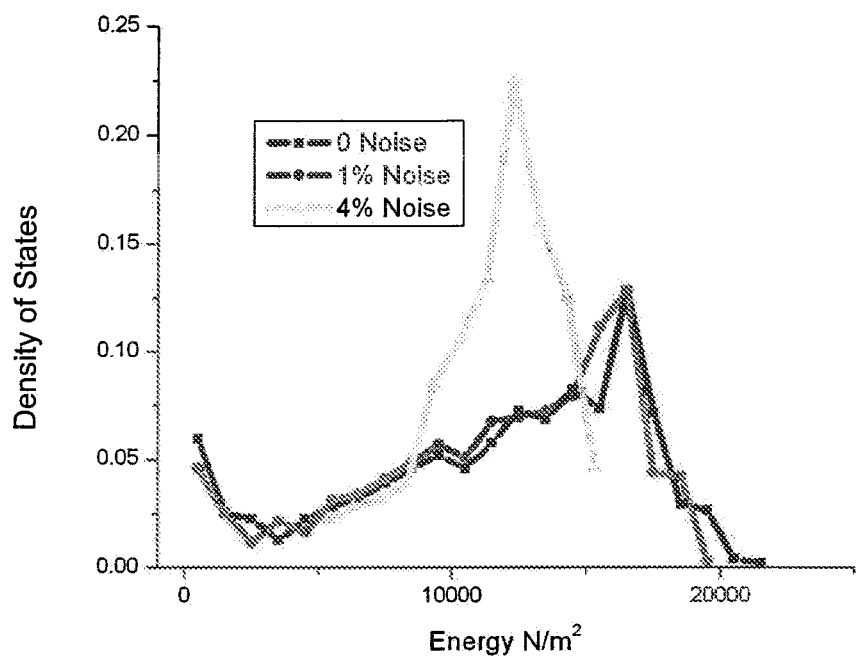
FIG. 14A shows the effect of noise introduction on adhesive force between adhesive elements of the present invention.
Figure 14B:
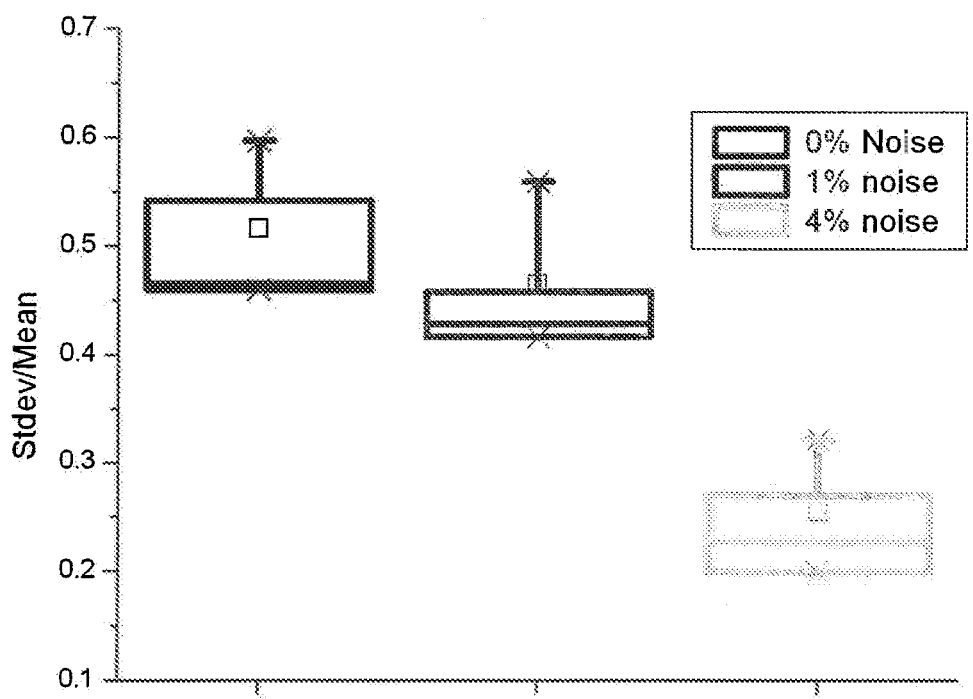
FIG. 14B shows the effect of noise on the standard deviation of adhesive force.
Figure 15:
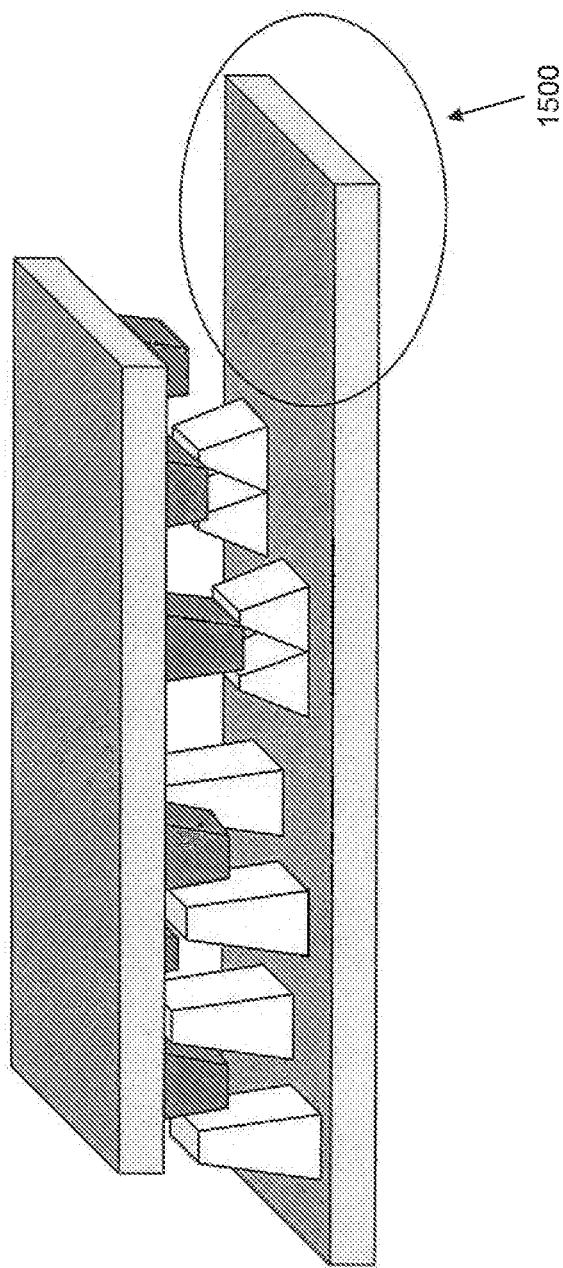
FIG. 15 shows an exemplary adhesive system in accordance with one embodiment of the invention which comprises an inert surface 1500.
Figure 16:
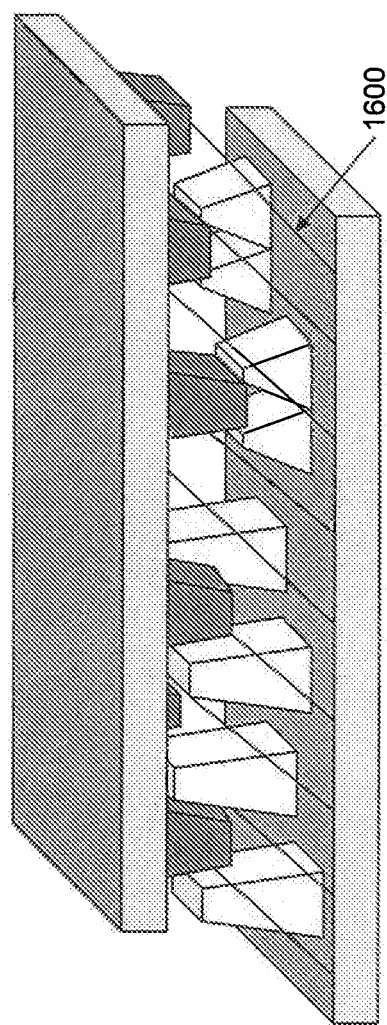
FIG. 16 shows an exemplary adhesive system in accordance with one embodiment of the invention which comprises one or more liquids 1600 present between the first and second arrays.

As shown in FIG. 14A, the addition of noise reduces the deviation in adhesive forces observed in various preparations, while maintaining a consistent mean adhesive force. The simulation presented in FIG. 14A was prepared using cone-shaped protrusions having a height of 10 microns, a radius of 4 microns, a pitch of 2× radius, and 0%, 1% or 4% noise. The addition of noise reduces the deviation observed (see FIG. 14B). The addition of noise thus allows for the development of adhesive elements that exhibit consistent adhesive forces.

Noise can be introduced into the adhesive elements of the present invention by various methods. For example, a master stamp can be prepared which contains structures exhibiting the desired noise. In another embodiment, small, individual stamps can be prepared that exhibit the desired noise. These smaller stamps (e.g., 1 cm×1 cm) can then be replicated over the entire surface of a substrate to prepare the adhesive element with the desired noise.

CONCLUSION

These examples illustrate possible embodiments of the present invention. While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. An adhesive system comprising:
    a first adhesive element comprising a flexible material, the element having a surface including an array of tapered protrusions thereon;
    a second adhesive element having a surface including an array of tapered protrusions or tapered grooves thereon,
    wherein the arrays of tapered protrusions or tapered grooves of the first and second adhesive elements have a periodicity that is substantially complementary,
    wherein contacting the first adhesive element with the second adhesive element results in a substantial interleaving of the tapered protrusions with the tapered protrusions or tapered grooves to provide a reversible adhesive interaction of about 1 N/cm$^2$ to about 100 N/cm$^2$ between the first and second adhesive elements,
    wherein contacting either of the first or second adhesive elements with an inert surface results in an adhesive interaction having a force per unit area of less than 50% of the adhesive interaction with a substantially complementary adhesive element, and
    wherein one or more liquids are present between the first and second arrays.

2. The adhesive system of claim 1, wherein the tapered protrusions of the first adhesive element and the tapered protrusions or tapered grooves of the second adhesive element are substantially free from barbs, hooks, spirals, loops, seta, spatulae, or suction cups.

3. The adhesive system of claim 1, wherein the contacting the first and second adhesive elements results in contact of greater than 30% of a total surface area that is desired to be contacted between the first array and the second array.

4. The adhesive system of claim 1, wherein the adhesive system is substantially impermeable to a liquid.

5. The adhesive system of claim 1, wherein the first adhesive element and the second adhesive element are electrostatically or magnetically complementary.

6. The adhesive system of claim 5, wherein the contacting the first and second adhesive elements results in contact of greater than 30% of a total surface area that is desired to be contacted between the first array and the second array.

7. An adhesive system comprising:
    a first adhesive element comprising an elastomeric material, the element having a surface including an array of protrusions thereon having a surface area; and
    a second adhesive element having a surface including an array of protrusions or grooves thereon having a surface area,
    wherein the protrusions of the first adhesive element and the protrusions or grooves of the second adhesive element are substantially free from barbs, hooks, spirals, loops, seta, spatulae, or suction cups,
    wherein contacting the first adhesive element with the second adhesive element results in a substantial interleaving of the arrays to provide a reversible adhesive interaction of about 1 N/cm$^2$ to about 100 N/cm$^2$ between the first and second adhesive elements,
    wherein contacting either of the first or second adhesive elements with an inert surface results in an adhesive interaction having a force per unit area of less than 50% of the adhesive interaction with a substantially complementary adhesive element, and
    wherein one or more liquids are present between the first and second arrays.

8. The adhesive system of claim 7, wherein the contacting results in an adhered structure that is substantially impermeable to a liquid.

9. The adhesive system of claim 7, wherein the first adhesive element and the second adhesive element are electrostatically or magnetically complementary.

10. An adhesive system comprising:
    a first adhesive element including a surface having an array of protrusions or grooves thereon, the protrusions or grooves having a base portion attached to the surface, a tip portion free from the surface, and a tapered body portion connecting the tip or groove portion with the base portion;

a second adhesive element including a surface having an array of protrusions or grooves thereon, the protrusions or grooves having a base portion attached to the surface, a tip portion free from the surface, and a tapered body portion connecting the tip or groove portion with the base portion, wherein the protrusions or grooves of the first and second adhesive elements have a vertical dimension of about 1 µm to about 500 µm, wherein the base portions of the first and second adhesive elements have a lateral dimension of about 1 µm to about 100 µm, wherein the tapered body portions of the first and second adhesive elements have a tapered sidewall with an average angle of taper of about 5° to about 50°, wherein the tip portions have a maximum lateral dimension at a point where the tip portion meets the tapered body portion, wherein at least one of the first and second adhesive elements comprises a flexible material, wherein contacting the first adhesive element with the second adhesive element results in a substantial interleaving of the arrays to provide a reversible adhesive interaction between the first and second adhesive elements, wherein the protrusions of the first and second adhesive elements are substantially free from barbs, hooks, spirals, loops, seta, spatulae, or suction cups, and wherein one or more liquids are present between the first and second arrays.

11. The adhesive system of claim 10, wherein at least one of the protrusions of the first and second adhesive elements has a Young's modulus of about 1 MPa to about 10 GPa.

12. The adhesive system of claim 10, wherein at least one of the protrusions of the first and second adhesive elements comprises an elastomeric material selected from the group consisting of a poly(dialkylsiloxane), a poly(silsesquioxane), a polyisoprene, a polybutadiene, a poly(acrylamide), a poly(alkylstylene), polychloroprene, an acryloxy elastomer, a copolymer thereof, and combinations thereof.

13. The adhesive system of claim 10, wherein the protrusions or grooves of the first and second adhesive elements are not bent upon themselves.

14. The adhesive system of claim 10, wherein the tip portions of the protrusions or grooves of the first and second adhesive elements have a lateral dimension of about 50 nm to about 50 µm.

15. The adhesive system of claim 14, wherein the lateral dimensions of the tip portions and base portions of the protrusions or grooves of the first and second adhesive elements have an aspect ratio of about 1:2 to about 1:2,000.

16. The adhesive system of claim 10, wherein the contacting the first adhesive element with the second adhesive element results in a substantial interleaving of the arrays to provide a reversible adhesive interaction of about 1 N/cm$^2$ to about 100 N/cm$^2$ between the first and second adhesive elements.

17. The adhesive system of claim 10, wherein the first adhesive element is affixed to a first area of a first substrate and the second adhesive element is affixed to a second area of a second substrate, and the first and second adhesive elements are positioned such that the protrusions or grooves of the first adhesive element substantially interleave with the protrusions or grooves of the second adhesive element to provide a reversible adhesive interaction between the first and second areas of the first and second substrates.

18. The adhesive system of claim 10, wherein the first adhesive element comprises an adhesive layer attached to a second surface of the first adhesive element and the second adhesive element comprises an adhesive layer attached to a second surface of the second adhesive element, wherein the adhesive layers are suitable for attaching the first and second adhesive elements to a substrate.

19. The adhesive system of claim 10, wherein the base portions, tapered body and tip portions of neighboring protrusions or grooves within the array of the first adhesive element do not contact one other; and the base portions, tapered body and tip portions of neighboring protrusions or grooves within the array of the second adhesive element do not contact one other.

20. The adhesive system of claim 10, wherein at least the tapered body portions of the first and second adhesive elements have a surface roughness of about one order of magnitude or less than the lateral dimensions of the first and second adhesive elements.

21. The adhesive system of claim 10, wherein the tapered body portion of the first adhesive element includes a first functional group and the tapered body portion of the second adhesive element includes a second functional group, and wherein the first and second functional groups are capable of interacting with one another via an interaction selected from a group consisting of a non-covalent interaction, a covalent bonding interaction, and combinations thereof.

22. The adhesive system of claim 10, wherein the tip portions of the protrusions or grooves of the first and second adhesive elements include a liquidphobic functional group.

23. The adhesive system of claim 10, wherein the arrays have a periodicity that is substantially complementary, and wherein the protrusions or grooves of the first and second adhesive elements have substantially the same vertical dimensions.

24. The adhesive system of claim 10, wherein the first and second adhesive elements comprise substantially a same composition.

25. The adhesive system of claim 10, wherein the contacting results in an adhered structure that is substantially impermeable to a liquid.

26. The adhesive system of claim 10, wherein the first adhesive element and the second adhesive element are electrostatically or magnetically complementary.

27. An adhesive system comprising:
a first adhesive element comprising a flexible material, the element having a surface including an array of tapered protrusions thereon;
a second adhesive element having a surface including an array of tapered protrusions or tapered grooves thereon,
wherein the arrays of tapered protrusions or tapered grooves of the first and second adhesive elements have a periodicity that is substantially complementary,
wherein contacting the first adhesive element with the second adhesive element results in a substantial interleaving of the tapered protrusions with the tapered protrusions or tapered grooves to provide an irreversible adhesive interaction between the first and second adhesive elements, and
wherein contacting either of the first or second adhesive elements with an inert surface results in an adhesive interaction having a force per unit area of less than 50% of the adhesive interaction with a substantially complementary adhesive element,
wherein the tapered protrusions of the first adhesive element and the tapered protrusions or tapered grooves of the second adhesive element are substantially free from barbs, hooks, spirals, loops, seta, spatulae, or suction cups, and wherein one or more liquids are present between the first and second arrays.

28. The adhesive system of claim 27, wherein the contacting the first and second adhesive elements results in contact of greater than 30% of a total surface area that is desired to be contacted between the first array and the second array.

29. The adhesive system of claim 27, wherein the adhesive system is substantially impermeable to a liquid.

30. The adhesive system of claim 1, 7, 10, or 27, wherein an elastic modulus of the protrusions of the first and second adhesive elements has a Young's modulus of about 1 MPa to about 10 GPa.

* * * * *